(12) United States Patent
Beeri et al.

(10) Patent No.: US 11,953,872 B2
(45) Date of Patent: Apr. 9, 2024

(54) METHODS AND SYSTEMS FOR THE MANAGEMENT OF PRECISE AGRICULTURAL IRRIGATION

(71) Applicant: MANNA IRRIGATION LTD., Gvat (IL)

(72) Inventors: Ofer Beeri, Kibbutz Yagur (IL); Shay Mey-Tal, Herzliya (IL)

(73) Assignee: MANNA IRRIGATION LTD., Gvat (IL)

( * ) Notice: Subject to any disclaimer, the term of this patent is extended or adjusted under 35 U.S.C. 154(b) by 793 days.

(21) Appl. No.: 17/047,042

(22) PCT Filed: Apr. 8, 2019

(86) PCT No.: PCT/IL2019/050396
§ 371 (c)(1),
(2) Date: Oct. 12, 2020

(87) PCT Pub. No.: WO2019/198072
PCT Pub. Date: Oct. 17, 2019

(65) Prior Publication Data
US 2021/0360885 A1 Nov. 25, 2021

(30) Foreign Application Priority Data
Apr. 12, 2018 (IL) .......................................... 258665

(51) Int. Cl.
G05B 19/042 (2006.01)
B64C 39/02 (2023.01)
B64U 101/30 (2023.01)

(52) U.S. Cl.
CPC .......... *G05B 19/042* (2013.01); *B64C 39/024* (2013.01); *B64U 2101/30* (2023.01); *G05B 2219/2625* (2013.01)

(58) Field of Classification Search
CPC ...................... G05B 19/042; G05B 2219/2625
See application file for complete search history.

(56) References Cited

U.S. PATENT DOCUMENTS

| 5,870,302 A | 2/1999 | Oliver |
| 7,058,197 B1 | 6/2006 | McGuire |
| 7,068,816 B1 | 6/2006 | Knoblauch |
| 8,135,178 B2 | 3/2012 | Hendrickson |

(Continued)

FOREIGN PATENT DOCUMENTS

| CN | 101551459 A | 10/2009 |
| CN | 102402185 A | 4/2012 |

(Continued)

OTHER PUBLICATIONS

Agam et al., (2007) A vegetation index based technique for spatial sharpening of thermal imagery. Remote Sensing of Environment 107: 545-558.

(Continued)

*Primary Examiner* — Chun Cao
(74) *Attorney, Agent, or Firm* — Rodney J. Fuller; BOOTH UDALL FULLER, PLC

(57) ABSTRACT

The present invention relates to the field of precision agriculture, particularly to systems and methods for providing crop coefficient (Kc) values including near real time and forecast values for the management of precise agricultural irrigation.

21 Claims, 15 Drawing Sheets

(56) References Cited

U.S. PATENT DOCUMENTS

| | | | |
|---|---|---|---|
| 8,671,006 B2 | 3/2014 | Zyskowski | |
| 8,816,262 B2 | 8/2014 | Holland | |
| 8,924,031 B1 | 12/2014 | Evett | |
| 9,113,590 B2 | 8/2015 | Johnson | |
| 9,131,642 B2 | 9/2015 | Groeneveld | |
| 9,817,380 B2* | 11/2017 | Bangalore | G05B 19/04 |
| 2009/0232349 A1 | 9/2009 | Moses | |
| 2011/0093123 A1* | 4/2011 | Alexanian | A01G 25/16 700/284 |
| 2017/0038749 A1 | 2/2017 | Mewes | |
| 2017/0295415 A1* | 10/2017 | Oezdemir | H04W 4/38 |
| 2018/0035622 A1* | 2/2018 | Gresch | A01G 22/00 |
| 2019/0281776 A1* | 9/2019 | Magnusson | G06V 20/17 |
| 2020/0214231 A1* | 7/2020 | Beeri | A01G 25/165 |
| 2021/0042523 A1* | 2/2021 | Rozenstein | G06T 7/0016 |

FOREIGN PATENT DOCUMENTS

| | | |
|---|---|---|
| EP | 3179319 A1 | 6/2017 |
| WO | 2015092800 A1 | 6/2015 |
| WO | 2017077543 A1 | 5/2017 |
| WO | 2018173045 A1 | 9/2018 |
| WO | 2019008570 A1 | 1/2019 |

OTHER PUBLICATIONS

Akdim et al., (2014) Monitoring of irrigation schemes by remote sensing: Phenology versus retrieval of biophysical variables. Remote Sensing 6(6): 5815-5851.

Allen and Pereira (2009) Estimating crop coefficients from fraction of ground cover and height. Irrig Sci 28: 17-34.

Anderson et al., (2004) Upscaling ground observations of vegetation water content, canopy height, and leaf area index during SMEX02 using aircraft and Landsat imagery. Remote Sensing of Environment 92: 447-464.

Beeri et al., (2017) Mapping Crop Coefficient using hi-frequency satellite imaging for weekly Irrigation Scheduling. ECPA 2017—11th European Conference on Precision Agriculture, Jul. 16-20, 2017; Edinburgh, United Kingdom; 1 page.

Carlson and Ripley (1997) On the relationship between NDVI, fractional vegetation cover, and leaf area index. Remote Sensing of Environment 62(3): 241-252.

Clark et al., (2002) Surface Reflectance Calibration of Terrestrial Imaging Spectroscopy Data: a Tutorial Using AVIRIS. Proceedings of the 10th Airborne Earth Science Workshop; 21 pages.

Cohen et al., (2003) Comparisons of land cover and LAI estimates derived from ETM+ and MODIS for four sites in North America: a quality assessment of 2000/2001 provisional MODIS products. Remote Sensing of Environment 88: 233-255.

Conceição et al., (2017) Three years of monitoring evapotranspiration components and crop and stress coefficients in a deficit irrigated intensive olive orchard. Agricultural Water Management 191:138-152.

Gao et al., (2006) On the blending of the landsat and MODIS surface reflectance: Predicting daily landsat surface reflectance. IEEE Transactions on Geoscience and Remote Sensing 44: 2207-2218.

Glenn et al., (2008) Relationship Between Remotely-sensed Vegetation Indices, Canopy Attributes and Plant Physiological Processes: What Vegetation Indices Can and Cannot Tell Us About the Landscape. Sensors 8: 2136-2160.

Hunt et al., (1987) Measurement of leaf relative water content by infrared reflectance. Remote Sensing of Environment 22: 429-435.

Jackson et al., (1981) Canopy temperature as a crop water stress indicator. Water Resources Research 17(4): 1133-1138.

Jackson et al., (2004) Vegetation water content mapping using Landsat data derived normalized difference water index for corn and soybeans. Remote Sensing of Environment 92: 475-482.

Johnson and Trout (2012) Satellite NDVI Assisted Monitoring of Vegetable Crop Evapotranspiration in California's San Joaquin Valley. Remote Sensing 4: 439-455.

Kamble et al., (2013) Estimating crop coefficients using remote sensing-based vegetation index. Remote Sensing 5(4): 1588-1602.

Kokaly et al., (1998) Mapping the biology and mineralogy of Yellowstone National Park using imaging spectroscopy. AVIRIS Workshop, Jan. 12-16, 1998. pp. 245-254.

Kopyt and Tsadok, "Everyday monitoring of stem water potential for decision making in irrigation of grapevines". Grapegrower & Winemaker Jul. 2015, pp. 44-48.

Kullberg et al., (2017) Evaluation of thermal remote sensing indices to estimate crop evapotranspiration coefficients. Agricultural Water Management 179: 64-73.

Montgomery et al., (2015) IrriSAT—weather based scheduling and benchmarking technology. 17th Australian Agronomy Conference, Sep. 20-24, 2015 Wrest Point Convention Centre, Hobart, Tasmania, Australia; pp. 1015-1018.

Moran et al., (1994) Estimating crop water deficit using the relation between surface-air temperature and spectral vegetation index. Remote Sensing of Environment 49(3): 246-263.

Moran et al., (1994) Irrigation management in Arizona using satellites and airplanes. Irrigation Science 15: 35-44.

Moran et al., (1997) Opportunities and limitations for image-based remote sensing in precision crop management. Remote Sensing of Environment 61(3): 319-346.

Moran et al., (2001) A refined empirical line approach for reflectance factor retrieval from Landsat-5 TM and Landsat-7 ETM+. Remote Sensing of Environment 78: 71-82.

Nagler et al., (2013) Estimating Riparian and Agricultural Actual Evapotranspiration by Reference Evapotranspiration and MODIS Enhanced Vegetation Index. Remote Sensing 5: 3849-3871.

O'Shaughnessy et al., (2015) Dynamic prescription maps for site-specific variable rate irrigation of cotton. Agricultural Water Management 159: 123-138.

Padro et al., (2017) Radiometric Correction of Simultaneously Acquired Landsat-7/Landsat-8 and Sentinel-2A Imagery Using Pseudoinvariant Areas (PIA): Contributing to the Landsat Time Series Legacy. Remote Sens. 9(12): 1319; 26 pages.

Rouse et al., (1974) Monitoring vegetation systems in the great plains with ERTS. The Proceedings of the Third Earth Resources Technology Satellite-1 Symposium; pp. 309-317.

Staben et al., (2011) Calibration of WorldView-2 satellite imagery to reflectance data using an empirical line method. Proceedings of the 34th International Symposium on Remote Sensing of Environment (ISRSE34), Apr. 2011, Sydney, Australia. 4 pages.

Tasumi et al., (2006) Calibrating Satellite-Based Vegetation Indices to Estimate Evapotranspiration and Crop Coefficients. Ground Water and Surface Water Under Stress: Competition, Interaction, Solutions, A USCID Water Management Conference, Boise, Idaho, USA, Oct. 25-28, 2006. Published by U.S. Committee on Irrigation and Drainage; pp. 103-112.

Van Beek et al., (2013) Stem Water Potential Monitoring in Pear Orchards through WorldView-2 Multispectral Imagery. Remote Sensing 5(12): 6647-6666.

Vanino et al., (2015) Estimation of evapotranspiration and crop coefficients of tendone vineyards using multi-sensor remote sensing data in a mediterranean environment. Remote Sensing 7(11): 14708-14730.

Wang and Qu (2007) NMDI: A normalized multi-band drought index for monitoring soil and vegetation moisture with satellite remote sensing. Geophysical Research Letters 34: L20405; 5 pages.

Xin et al., (2013) Toward near real-time monitoring of forest disturbance by fusion of MODIS and Landsat data. Remote Sensing of Environment 135: 234-247.

* cited by examiner

Remove from the first set of HRKc values any of which is less than a first threshold being the sum of HRKc-$_{M1}$ minus one STD to obtain a second set of HRKc values.

— 560

Remove from the second set of HRKc values any of which is greater than a second threshold value being the the sum of HRKc-$_{M1}$ plus two STD's to obtain a third set of HRKc values

— 570

Compute from the third set of HRKc values a second mean of HRKc values, HRKc-$_{M2}$

— 580

Set HRKc$^{NRT}$ to equal the value of HRKc-$_{M2}$

Set parameter $Kc^{MID}$ as the maximal Kc value from the RCCC within the middle growing period (MGP) — 1010

Set parameter $\Delta T_1$ equal to the number of days from time t to time $t_f$ — 1020

Set parameter $\Delta T_2$ equal to the number of days from time t to the start of the MGP ($t_{(MGPs)}$) — 1030

Set FKc equal to the sum of:
$Kc^{NRT}(t)$ plus $((((Kc^{MID} - Kc^{NRT}(t))/\Delta T_2) * \Delta T_1)$ — 1040

FIGURE 8b

METHODS AND SYSTEMS FOR THE MANAGEMENT OF PRECISE AGRICULTURAL IRRIGATION

CROSS-REFERENCE TO RELATED APPLICATIONS

This application is the U.S. National Stage of International Application No. PCT/IL2019/050396, filed on Apr. 8, 2019, which claims the benefit of and priority to Israeli Application No. 258665, filed on Apr. 12, 2018, the contents of each of which are hereby incorporated by reference in their entireties.

FIELD OF THE INVENTION

The present invention relates to the field of precision agriculture, particularly to systems and methods for providing crop coefficient (Kc) values including near real time and forecast values for the management of precise agricultural irrigation.

BACKGROUND OF THE INVENTION

Irrigation management is an important factor in the production of high yield and high-quality agricultural crops. Several factors are motivating the agricultural industry to seek new technologies that improve the management of crop production. These factors include the decrease in available agricultural land, increased use of marginal agricultural lands, world-wide weather changes, and the increasing costs of energy.

Management of field crop irrigation requires high frequency of decision making, based on the plants water demands. An irrigation recommendation is typically determined using equations for estimating the crop evapotranspiration (ET). Such equations and methods exist, with the Penman-Monteith equation adopted as a standard by the United Nations Food and Agriculture Organization (FAO). The Penman-Monteith equation links plant properties to weather conditions (including temperature, humidity, wind, and radiation) to the mass or volume of water lost to evapotranspiration. Since plant properties vary s within different plant species, and the properties of particular plant species may vary throughout the growth cycle, it is an accepted practice to calculate actual evapotranspiration of a crop (ETa) using calculations based on the evapotranspiration of a reference crop (such as alfalfa or grass) multiplied by modulating coefficients:

$$ETa = ET0 * Kc$$

wherein ET0 is the evapotranspiration rate of the reference crop (e.g. obtained from a weather station or local weather service, also referred to as $ET_r$), and Kc is a crop coefficient that varies by crop species and growth stage. Kc, if calculated from local actual crop parameters (Allen R G and Pereira L S, 2009. Irrig Sci 28:17-34) such as height (H), leaf area index (LAI) or fraction of crop cover (Fc), can be used as actual indicator for water demand for a specific field.

Presently, crop related information may be obtained using remote sensing platforms, including, for example, unmanned aerial vehicle/systems (UAV/UAS), aircraft, satellites, and land vehicles. The sensors allow raw image data to be collected on the agricultural land of interest as the platform passes over the crop. Typically, the raw image data is from one or more discrete bands in the electromagnetic spectrum that are capable of yielding agricultural information, and there is an ongoing attempt to optimize data processing in order to obtain accurate agricultural information (for example, U.S. Pat. Nos. 7,068,816, 8,135,178, 8,816,262, 9,113,590; International (PCT) patent Application No. WO 2017/077543: and Padro J-C et al., 2017. Remote Sens 9:1319).

Remote sensing can be utilized to map parameters required to calculate Kc on pixel level and field level and the calculated Kc is then used in producing plant water demand as described hereinabove.

One of the disadvantages of satellite imagery is the satellite revisit time at a certain location. For example, mapping satellite ETa values for irrigated crop in fields are performed today only with Landsat imagery, with an overpass larger than 7 days. Montgomery et al. rely on an 8-16-day cycle to generate a baseline Kc for a given pixel and then forecast irrigation amounts using ET0 obtained from weather station forecasts for one week in advance. (Montgomery J et al. 2015. Proceedings of the $17^{th}$ ASA Conference, 20-24 Sep. 2015, Hobart, Australia; agronomy2015.com.au). This method uses only one satellite and cannot provide more frequently updated Kc values. However, precise irrigation management requires a frequent image acquisition and delivery to the end-user, as crop parameters that relate to Kc (Fc and/or LAI) may be significantly changing every 3-5 days (Moran M S et al., 1994. Remote Sens Environ 49:246-263). While several satellite may have this desired turnover time (the total time the user can afford to postpone crop treatment (including irrigation, while waiting for processed information, see Moran M S Et al., 1997. Remote Sens Environ 61:319-346), obtaining the data is currently highly expensive.

There is a great need for, and it would be highly advantageous to have systems and methods for obtaining frequent updates of Kc values at economic costs for optimizing irrigation management.

SUMMARY OF THE INVENTION

The present invention provides systems and methods for obtaining frequently updated crop coefficient (Kc) values, including near-real time values and forecast values. The systems and methods are based on data obtained from a multiplicity of remote sensors that are standardized and applied in a computational environment for generating Kc values. The generated Kc is useful in obtaining actual evapotranspiration (ETa) values for a crop, a value which is essential for planning and executing an irrigation recommendation. The irrigation recommendation generated based on the Kc as provided by the present invention may be applied in a variable spatial resolution of irrigation blocks, including blocks from as small as one square meter (1 m²) and not bounded by any upper size limit of field or management zone area. The irrigation recommendation, in addition to optimal irrigation time and quantity may further includes recommendations for a preferred irrigation method and water quality (mainly water salinity). The methods and systems of the invention may further provide forecast of irrigation-significant precipitations and yield.

The present invention is based in part on a novel method for determining values of the crop coefficient including near real time and forecast values throughout a growing season. The Kc values are useful in obtaining ETa values and generating and optionally executing an irrigation plan.

More particularly, the present invention utilizes a multiplicity of remote sensors, comprising sensors providing high resolution and atmospheric calibrated imagery data and sensors providing low resolution or un-atmospheric corrected imagery data of a crop field or a subplot thereof for generating near real time Kc values. In combination with reference Kc values, the methods and systems of the present invention can further generate forecast Kc values, thus providing the end user complete tools for generating and optionally executing an irrigation plan.

According to one aspect, the present invention provides a method for generating a near real time crop coefficient (Kc) for use in managing agricultural irrigation of a crop in a field or a subplot thereof, the method comprising:

within a computing environment comprising at least one computer processor and at least one computer-readable storage medium operably coupled to the computer processor and having program instructions stored therein, and data specifying a boundary of the field and of at least one subplot, the computer processor being operable to execute the program instructions to generate a high resolution (HR) near real time (NRT) crop coefficient ($HRKc^{NRT}$) at a time t ($HRKc^{NRT}(t)$) by:

receiving remote sensing data from one or more high spatial resolution remote sensors at a time t, wherein the imagery data comprise values associated with a plurality of pixels, each pixel is equal to or less than 30 m×30 m;

computing a high-resolution Kc (HRKc) value for each pixel, the pixel being in its entirety within the boundaries of at least one subplot, using a remote sensing derived index to obtain a plurality of HRKc values;

selecting HRKc values equal to or greater than a number in the range of 0.15 to 0.3 from the plurality of HRKc values, to obtain a first set of selected HRKc values;

computing from the first set of selected HRKc values a first mean HRKc value ($HRKc\text{-}_{M1}$) and a standard deviation (STD);

removing from the first set of HRKc values any of which is less than a first threshold being the sum of $HRKc\text{-}_{M1}$ minus one STD to obtain a second set of HRKc values;

removing from the second set of HRKc values any of which is greater than a second threshold value being the sum of $HRKc\text{-}_{M1}$ plus two STD's to obtain a third set of HRKc values;

computing from the third set of selected values a second mean HRKc value ($HRKc\text{-}_{M2}$); and setting the $HRKc^{NRT}(t)$ to equal $HRKc\text{-}_{M2}$.

According to certain exemplary embodiments, the method further comprises a step of providing at least one high spatial resolution remote sensor.

According to certain embodiments, selecting the HRKc values comprises selecting values equal to or greater than 0.3.

The term "subplot", interchangeably used herein with the terms "zone", "managing zone", and "irrigation block" refers to an area controlled by a single irrigation operation unit. According to certain exemplary embodiments, the single irrigation operation unit is a valve.

The term "field" as used herein refers to an area comprising at least one subplot. According to certain embodiments, the filed comprises at least two subplots. According to certain exemplary embodiments, a field comprises a plurality of subplots.

According to some embodiments, the $HRKc^{NRT}$ value is generated based on a plurality of pixels corresponding to a single subplot. According to some embodiments, the plurality of pixels corresponds to a plurality of subplots. According to these embodiments, the subplots can be consecutive or scattered.

According to certain embodiments, the remote sensing data for each pixel or a plurality of pixels correspond to a respective area within the field or subplot.

Any platform comprising remote sensors capable of providing images of a field or a subplot thereof can be used according to the teachings of the present invention. The remote sensor can provide high resolution and/or low-resolution spectral data as is specified by each of the methods of the invention.

According to certain embodiments, the remote sensor-comprising platform is selected from the group consisting of satellites, unmanned aerial vehicles, manned aerial vehicles, and filed-level photography platform including, but not limited to, ground based robots and field and farm equipment on which the sensors are mounted. Each possibility represents a separate embodiment of the present invention. Any method for field navigation can be used according to the teachings of the present invention as long it enables the remote sensors to provide the imagery data.

According to certain exemplary embodiments, the remote sensing data are obtained from one or more satellites.

According to certain embodiments, the remote sensing data are received from a plurality of remote sensors. The plurality of the remote sensor can be the same or different.

According to certain exemplary embodiments, the remote sensing data are received from a plurality of satellites.

According to certain embodiments, the remote sensing data are selected from the group consisting of spectral reflectance data, thermal data, radar data and Light Detection and Ranging (LiDAR) data of the crop canopy. Each possibility represents a separate embodiment of the present invention.

According to certain exemplary embodiments, the remote sensing data are spectral data.

Spectral and preferably also spatial calibration of imagery data acquired from different sensors and optionally also on different dates is highly desired for generating coherent presentation of the corresponding area.

According to certain exemplary embodiments, the remote sensing derived index used for computing the Kc values according to the teachings of the invention utilizes calibrated surface reflectance imagery pixel data obtained from the plurality of sensors.

According to some exemplary embodiments, calibration of the remotely sensed data uses de novo correlation of imagery data received for a pixel at a certain time with surface reflectance data received from atmospheric models or by employing the Empirical Line Method.

According to additional or alternative exemplary embodiments, calibration of the remotely sensed data comprises smoothing the obtained data. Any algorithm known in the Art may be used for the imagery data smoothing. However, the present invention now shows that an improved smoothed curve is obtained when for imagery data obtained at a time t, only imagery data obtained before time t are considered for smoothing the signal of time t.

Advantageously, calibration of the imagery data provides for a coherent index irrespective of the type of sensor from which the data are derived, thus for a simple and accurate computation of the Kc.

According to certain embodiments, the index is a vegetation index. Any vegetation index as is known in the Art can be used according to the teachings of the present invention. According to certain exemplary embodiments, the vegetation index is selected from the group consisting of a normalized difference vegetation index (NDVI); modified NDVI; an enhanced vegetation index (EVI); a wide dynamic range vegetation index (WDRVI); a red-green simple ratio; a red edge inflection point (REIP) and a visible atmospherically resistant index (VARnir). According to these embodiments, Kc values are computed using equations corresponding to a vegetative index as are known in the art.

According to certain embodiments, the method further comprises computing an actual evapotranspiration (ETa) value based on the computed $HRKc^{NRT}$ value.

According to additional embodiments, the method further comprises setting an irrigation recommendation.

According to certain embodiments, the method further comprises generating, as output data, the $HRKc^{NRT}$, ETa, irrigation recommendation or a combination thereof.

According to certain embodiments, the method further comprises delivering the output $HRKc^{NRT}$ or ETa value or the irrigation recommendation to a remote device of at least one user.

According to certain embodiments, the output $HRKc^{NRT}$ and/or ETa values are delivered and the user is being in charge of setting an irrigation recommendation.

According to certain embodiments, the output irrigation recommendation is delivered and the user is being in charge of setting irrigation.

According to some embodiments, the user is a third party or an individual farmer.

According to certain additional or alternative embodiments, the method further comprises delivering the output $HRKc^{NRT}$ value, ETa value or irrigation recommendation to at least one irrigation operation unit located near or within the field.

As described hereinabove, hitherto known methods for computing Kc values for planning agricultural irrigation from remote sensing imagery data utilize data obtained at a time line of once in eight to sixteen days, based on the availability of high-resolution imagery data, typically obtained from satellites. Reference Kc values are used in between. However, as described hereinabove, it is highly desired that actual crop data, including Kc, are obtained within cycles of no more than 72 h in order to plan an efficient agricultural irrigation and to update irrigation plans. The present invention now provides a method for combining remote sensing imagery data obtained from a plurality of sensors, including sensors providing high resolution images as well as sensors providing low resolution images, for computing near real time Kc. Since low resolution imagery data can be obtained at least once a day, including when the image is received from a satellite, the requirement of a cycle of no more than 72 h and even shorter cycles in answered.

According to additional aspect, the present invention provides a method for generating a near real time combined Kc value ($CKc^{NRT}$) for use in managing agricultural irrigation during a period of time, the period defined by time t in which high resolution remote sensing data are available and time $t_x$ to $t_{nx}$ ($t_x$-$t_{nx}$) in which high resolution remote sensing data are not available, the method comprising:

within a computing environment being operable to generate a high resolution near real time Kc ($HRKc^{NRT}$) as described hereinabove, generating the $CKc^{NRT}$ by performing the steps of:
computing a low resolution near real time Kc value ($LRKc^{NRT}$) at a time t'($LRKc^{NRT}$(t')) wherein t' is between time t to time $t_{nx}$ ($t$-$t_{nx}$) by:
receiving remote sensing data from one or more low resolution remote sensors at time t', wherein the imagery data comprise values associated with at least one pixel, each pixel is greater than 30 m×30 m;
selecting at least one pixel having 67% of the pixel data within the boundaries of the field; and
if more than one pixel is selected:
computing Kc value for each pixel using a remote sensing derived index to obtain a first set of LRKc values;
selecting LRKc values equal to or greater than a number in the range of 0.15 to 0.3 from the first set to obtain a second set of selected LRKc values;
computing a mean of the second set of Kc values to obtain $LRKc^{NRT}_{-M}$; and
setting $LRKc^{NRT}$(t') to equal $LRKc^{NRT}_{-M}$;
if one pixel is selected:
computing Kc value for the pixel using a remote sensing derived index; and
if the Kc value is equal to or greater than a number in the range of 0.15 to 0.3, setting the computed Kc value $LRKc^{NRT}$(t');
computing $CKc^{NRT}$ during the time period t to $t_{nx}$(t-$t_{nx}$) by:
at time t, setting the $CKc^T$ to equal the obtained $HRKc^T$(t);
at each time point $t_x$ to $t_{nx}$, with each time point incremented by a discrete time amount of x, computing $LRKc^{NRT}$($t_x$-$t_{nx}$) and setting the $CKc^{NRT}$ to equal the sum of $HRKc^{NRT}$(t)+ [($LRKc^{NRT}$($t_{nx}$) minus ($LRKc^{NRT}$(t')].

According to certain exemplary embodiments, the method further comprises a step of providing at least one high spatial resolution remote sensor and at least one low spatial resolution remote sensor.

According to certain embodiments, selecting the HRKc values comprises selecting values equal to or greater than 0.3.

According to certain embodiment, the discrete time amount of x is about a day.

According to some embodiments, subscript n denotes a number of days in which high resolution remote sensing data are not available, typically ranging from 1 day to 32 days.

According to some embodiments, the subscript n denotes a number of days from 1 day to 18 days.

According to additional or alternative embodiments, the n denotes a number of days from 2 days to 7 days, or from 2 days to 5 days.

According to certain embodiments, the time $t_x$ denotes time t plus 1 day.

According to certain embodiments, the method further comprises computing an actual evapotranspiration (ETa) value based on the computed $CKc^{NRT}$ value.

According to additional embodiments, the method further comprises setting an irrigation recommendation.

According to certain embodiments, the method further comprises generating, as output data, the $CKc^{NRT}$, ETa, irrigation recommendation or a combination thereof.

According to certain embodiments, the method further comprises delivering the output $CKc^{NRT}$ value, the ETa value, the irrigation recommendation or a combination thereof to a remote device of at least one user.

According to certain embodiments, the output $CKc^{NRT}$ and/or ETa values are delivered and the user is being in charge of setting an irrigation recommendation.

According to certain embodiments, the output irrigation recommendation is delivered and the user is being in charge of setting irrigation. According to some embodiments, the user is a third party or an individual farmer.

According to certain additional or alternative embodiments, the method further comprises delivering the output $CKc^{NRT}$ value, ETa value or irrigation recommendation to at least one irrigation operation unit located near or within the field.

The present invention further provides a method for calculating a forecast Kc value. Having a forecast Kc value is of high importance when an irrigation plan/recommendation should be based on a predetermined irrigation time.

According to an additional aspect, the present invention provides a method for generating a forecast Kc (FKc) for use in managing agricultural irrigation of a crop in a field or a subplot thereof during a growing period, the method comprising:

within a computing environment comprising at least one computer processor and at least one computer-readable storage medium operably coupled to the computer processor and having program instructions stored therein and data specifying a boundary of the field and/or at least one subplot thereof and a reference crop coefficient curve (RCCC) for the growing period, the computer processor being operable to execute the program instructions to generate the FKc by performing the steps of:

obtaining near real time Kc ($Kc^{NRT}$) at a time t ($Kc^{NRT}(t)$);
setting a time $t_f$ for which FKc is required; and
if t and $t_f$ are within the start of the initial growth period (IGP) to the start of the middle growing period (MGP) on the time axis of the RCCC:
  obtaining a maximum Kc value from the RCCC at the MGP ($Kc^{MID}$);
  computing the number of days from t to $t_f$ to obtain $\Delta T_1$
  computing the number of days from t to the start of the MGP ($t_{MGPs}$) to obtain $\Delta T_2$;
  computing FKc to equal $Kc^{NRT}(t)+([Kc^{MID}-Kc^{NRT}(t)]/\Delta T_2)*\Delta T_1$, and
if t is before or within a period from the start of the MGP to the end of the MGP on the time axis of the RCCC and $t_f$ is within the period;
  obtaining a threshold minimal Kc value from the RCCC for said period ($ThrKc^{MID}$);
  obtaining $Kc^{NRT}$ at a time $t_L$ ($Kc^{NRT}t_L$) which is before the time t; and
    if $KC^{MID}>Kc^{NRT}(t)>KC^{NRT}-ThrKc^{MID}$, setting FKc to equal $Kc^{NRT}(t)$;
    if $KC^{MID}<Kc^{NRT}(t)$, setting FKc to equal $KC^{MID}$;
    if $Kc^{NRT}(t)<K^{NRT}t_L-ThrKc^{MID}$, setting FKc to equal $Kc^{NRT}(t_L)$; and
if t and $t_f$ are within a period from the start of the late growing period (LGP, LGPs) to the end of the LGP (LGPe) on the time axis of the RCCC:
  obtaining the most recent $Kc^{NRT}$ value from the MGP ($MGPKc^{NRT}(r)$);
  obtaining a minimum Kc value from the RCCC at LGPe ($Kc^{LGPe}$);
  computing the number of days from the start of the LGP ($t_{LGPs}$) to $t_f$ obtaining $\Delta T_3$;
  computing the number of days from the start of the LGP ($t_{LGPs}$) to the end of the LGP ($t_{LGPe}$) to obtain $\Delta T_4$; and
    if $Kc^{NRT}(t)>Kc^{LGPe}$, computing FKc to equal $MGPKc^{NRT}(r)-([MGPKc^{NRT}(r)-Kc^{LGPe}]/\Delta T_4)*\Delta T_3$;
    if $Kc^{NRT}(t)<Kc^{LGPe}$, setting FKc to equal $Kc^{LGPe}$.

The reference crop coefficient curve (RCCC) can be produced from published tabular values, from archive data analyses, including by analyses by machine learning techniques or from a combination thereof. The minimal threshold Kc value of the middle growing period ($ThrKc^{MID}$) is an empirical value, set as the lowest Kc value to be used throughout this period computed to reflect vegetation-related spectral data changes not related to evapotranspiration. According to certain embodiments, the value of $ThrKc^{MID}$ is in the range of from 0.1 to 0.5.

According to certain embodiments, the value of $ThrKc^{MID}$ is in the range of from 0.2 to 0.4. According to certain exemplary embodiments, the value of $ThrKc^{MID}$ is 0.24.

According to certain embodiments, near real time Kc ($Kc^{NRT}$) values used in the method for computing a forecast Kc are high resolution near real time Kc ($HRKc^{NRT}$) values obtained according the methods of the present invention as described hereinabove.

According to certain embodiments, the near real time Kc ($Kc^{NRT}$) values are combined near real time Kc ($CKc^{NRT}$) values obtained according the methods of the present invention as described hereinabove.

According to certain embodiments, the method further comprises computing an actual evapotranspiration (ETa) value based on the computed FKc value. According to additional embodiments, the method further comprises setting an irrigation recommendation.

According to certain embodiments, the method further comprises generating, as output data, the FKc value, ETa value, irrigation recommendation or a combination thereof.

According to certain embodiments, the method further comprises delivering the output $FKc^{NRT}$ value, the ETa value, the irrigation recommendation or a combination thereof to a remote device of at least one user.

According to certain embodiments, the output FKc and/or ETa values are delivered and the user is being in charge of setting an irrigation recommendation.

According to certain embodiments, the output irrigation recommendation is delivered and the user is being in charge of setting irrigation. According to some embodiments, the user is a third party or an individual farmer.

According to certain additional or alternative embodiments, the method further comprises delivering the output $FKc^{NRT}$ value, ETa value or irrigation recommendation to at least one irrigation operation unit located near or within the field.

According to another aspect, the present invention provides a non-transitory computer readable medium having stored therein instructions executable by a computer system configured to implement the method generating Kc for use in managing agricultural irrigation of a crop in a field or a part thereof according to the teachings of the invention, wherein the Kc is selected from the group consisting of $HRKc^{NRT}$, $CKc^{NRT}$ and $FKc^{NRT}$.

According to yet another aspect, the present invention provides a system for generating crop coefficient (Kc) values for managing agricultural irrigation of a crop in a field or a part thereof, the system comprising:

a computing environment, the computing environment comprising:
  at least one computer-readable storage medium having computer-executable instructions stored therein and data specifying a crop type, a boundary of the field and of at least one subplot; and at least one computer processor operably coupled to at least one computer-readable storage medium and configured by the computer-executable instructions;
wherein the computing environment is able to:
  receive remote sensing data from one or more high resolution remote sensors at a time t, wherein the imagery data comprises a plurality of pixels, each pixel is equal to or less than 30 m×30 m;
  receive remote sensing data from one or more low resolution remote sensors at time t', wherein the imagery data comprises at least one pixel, each pixel is greater than 30 m×30 m and is equal or less than 300 m×300 m;
  compute a near real time combined crop coefficient ($CKc^{NRT}(t)$) by;
    computing a high-resolution Kc (HRKc) value for each pixel, the pixel being in its entirety within the boundaries of at least one subplot, using a remote sensing derived index to obtain a plurality of HRKc values;
    selecting HRKc values equal to or greater than a number in the range of 0.15 to 0.3 from the plurality of HRKc values, to obtain a first set of selected HRKc values;
    computing from the first set of selected HRKc values a first mean HRKc value ($HRKc_{-M1}$) and a standard deviation (STD);
    removing from the first set of validated HRKc values any of which are less than a first threshold being the sum of $HRKc_{-M1}$ minus one STD to obtain a second set of HRKc values;
    removing from the second set of HRKc values any which are greater than a second threshold value being the sum of $HRKc_{-M1}$ plus two STD's to obtain a third set of HRKc values;
    computing from the third set of selected values a second mean HRKc value ($HRKc_{-M2}$); and
    setting the HRKcNRT(t) to equal $HRKc_{-M2}$;
  compute a low resolution near real time Kc value ($LRKc^{NRT}$) at a time t' ($LRKc^{NRT}(t')$) wherein t' is between time t to time $t_{nx}$ (t−tnx) by:
    receiving remote sensing data from one or more low resolution remote sensors at time t', wherein the imagery data comprises at least one pixel, each pixel is greater than 30 m×30 m;
    selecting at least one pixel having 67% of the pixel data within the boundaries of the field; and
    if more than one pixel is selected:
      computing Kc value for each pixel using a remote sensing derived index to obtain a first set of LRKc values;
      selecting LRKc values equal to or greater than a number in the range of 0.15 to 0.3 from the first set to obtain a second set of selected LRKc values;
      computing a mean of the selected Kc values to obtain $LRKc^{NRT}_{-M}$;
      and setting $LRKc^{NRT}(t')$ to equal $LRKc^{NRT}_{-M}$;
    if one pixel is selected:
      computing Kc value for the pixel using a remote sensing derived index; and
      if the Kc value is equal to or greater than a number in the range of 0.15 to 0.3, setting the computed Kc value $LRKc^{NRT}(t')$;
  computing $CKc^{NRT}$ during the time period t to $t_{nx}$(t−tnx):
    at time t, setting the $CKc^{NRT}$ to equal the obtained $HRKc^{NRT}(t)$;
    at each time point $t_x$ to $t_{nx}$, with each time point incremented by a discrete time amount of x, computing $LRKc^{NRT}(t_x-t_{nx})$ and setting the $CKc^{NRT}$ to equal the sum of $HRKc^{NRT}(t)+[(LRKc^{NRT}(t_{nx})$ minus $(LRKc^{NRT}(t')]$.

According to certain exemplary embodiments, the system further comprises at least one high spatial resolution remote sensor and at least one low spatial resolution remote sensor.

According to certain embodiments, selecting the HRKc values comprises selecting values equal to or greater than 0.3.

According to yet additional aspect, the present invention provides a system for providing a forecast Kc crop coefficient (FKc) for use in managing agricultural irrigation of a crop in a field or a subplot thereof, the system comprising:
  a computing environment, the computing environment comprising:
    at least one computer-readable storage medium having computer-executable instructions stored therein and data specifying a crop type, a boundary of the field and/or at least one subplot thereof, and a reference crop coefficient curve (RCCC) for the growing period; and
    at least one computer processor operably coupled to at least one computer-readable storage medium and configured by the computer-executable instructions;
  wherein the computing environment is able to:
  compute a forecast Kc crop coefficient FKc(t) by;
    obtaining near real time Kc ($Kc^{NRT}$) at a time t ($Kc^{NRT}(t)$);
    setting a time $t_f$ for which FKc is required; and
    if t and $t_f$ are within the start of the initial growth period (IGP) to the start of the middle growing period (MGP) on the time axis of the RCCC:
      obtaining a maximum Kc value from the RCCC at the MGP ($Kc^{MID}$);
      computing the number of days from t to $t_f$ to obtain $\Delta T_1$
      computing the number of days from t to the start of the MGP ($t_{MGPs}$) to obtain $\Delta T_2$;
      computing FKc to equal $Kc^{NRT}(t)+([Kc^{MID}-Kc^{NRT}(t)]/\Delta T_2)*\Delta T_1$; and
    if t is before or within a period from the start of the MGP to the end of the MGP on the time axis of the RCCC and $t_f$ is within the period;
      obtaining a threshold minimal Kc value from the RCCC for said period ($ThrKc^{MID}$);
      obtaining $Kc^{NRT}$ at a time $t_L$ ($Kc^{NRT}t_L$) which is before the time t; and
      if $KC^{MID}>Kc^{NRT}(t)>KC^{NRT}-ThrKc^{MID}$, setting FKc to equal $Kc^{NRT}(t)$;
      if $KC^{MID}<Kc^{NRT}(t)$, setting FKc to equal $KC^{MID}$;
      if $Kc^{NRT}(t)<Kc^{NRT}t_L-ThrKc^{MID}$, setting FKc to equal $Kc^{NRT}(t_L)$; and
    if t and $t_f$ are within a period from the start of the late growing period (LGP, LGPs) to the end of the LGP (LGPe) on the time axis of the RCCC:
      obtaining the most recent $Kc^{NRT}$ value from the MGP ($MGPKc^{NRT}(r)$);
      obtaining a threshold Kc value from the RCCC at LGPe ($Kc^{LGPe}$);
      computing the number of days from the start of the LGP ($t_{LGPs}$) to $t_f$ obtaining $\Delta T_3$,
      computing the number of days from the start of the LGP ($t_{LGPs}$) to the end of the LGP ($t_{LGPe}$) to obtain $\Delta T_4$; and if $Kc^{NRT}(t) > Kc^{LGPe}$ computing FKc to equal $MGPKc^{NRT}(r) - ([MGPKc^{NRT}(r) - Kc^{LGPe}]/\Delta T_4) * \Delta T_3$;

if $Kc^{NRT}(t) < Kc^{LGPe}$, setting FKc to equal $Kc^{LGPe}$.

It is to be understood that any combination of each of the aspects and the embodiments disclosed herein is explicitly encompassed within the disclosure of the present invention.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiments of methods and/or devices herein may involve performing or completing selected tasks manually, automatically, or a combination thereof. Some embodiments are implemented with the use of components that comprise hardware, software, firmware or combinations thereof. In some embodiments, some components are general-purpose components such as general-purpose computers or processors. In some embodiments, some components are dedicated or custom components such as circuits, integrated circuits or software.

For example, in some embodiments, some of an embodiment may be implemented as a plurality of software instructions executed by a data processor, for example which is part of a general-purpose or custom computer. In some embodiments, the data processor or computer may comprise volatile memory for storing instructions and/or data and/or a non-volatile storage, for example a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results).

BRIEF DESCRIPTION OF THE FIGURES

FIGS. 8a-8d present flowcharts describing a method for determining forecast crop coefficient (FKc) values according to certain embodiments of the present invention. FIG. 8a: the general steps of the method. FIG. 8a: determining the FKc value during the initial and developmental growing periods. FIG. 8b: determining the FKc value during the middle developmental growing periods. FIG. 8c: determining the FKc value during the late growing periods.

DETAILED DESCRIPTION OF THE INVENTION

Figure 1:
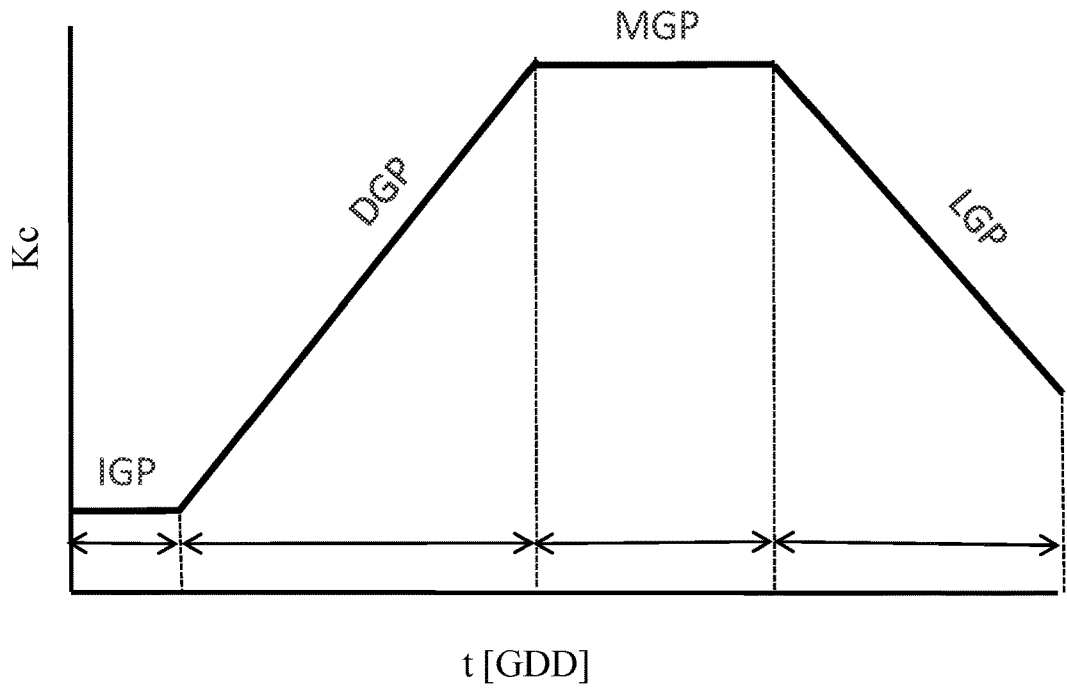
FIG. 1 schematically depicts a reference crop coefficient curve (RCCC) of Kc values during growing periods: an initial growing period (IGP), a development growing period (DGP), a middle growing period (MGP) and a late growing period (LGP).

The present invention utilizes a multiplicity of remote sensors, comprising sensors providing high resolution imagery data and sensors providing low resolution imagery data of a crop field or a subplot thereof for generating near real time Kc values. In combination with reference Kc values, the methods and systems of the present invention can further generate forecast Kc values, thus providing the end user complete tools for generating and optionally executing an irrigation plan.

Definitions

The terms "drone", "unmanned aerial vehicle", "UAV", "unmanned aircraft systems", "UASes" and "unmanned aircraft" as used herein are interchangeable.

The terms "standard deviation", "SD" and "STD", as used herein are interchangeable. The terms are used according to their meaning in the art, particularly to a number representing the amount of variation of a data set from the average of the data as defined in statistics.

The terms "near real time" and "quasi real time", as used herein are interchangeable, where the definition of "quasi" and "near" is defined as "partly" or "almost". According to certain embodiments, since an absolute real time is not possible, almost real time provides a value near a time event that is close enough.

The terms "high resolution Kc" and "HRKc" as used herein are interchangeable.

The terms "low resolution Kc" and "LRKc", as used herein are interchangeable.

The terms "high resolution near real time $Kc^{NRT}$" and "$HRKc^{NRT}$", as used herein are interchangeable.

The terms "low resolution near real time $Kc^{NRT}$" and "$LRKc^{NRT}$", as used herein are interchangeable.

The terms "first mean HRKc", "$HRKc\text{-}_{m1}$" and "$HRKc\text{-}_{M1}$" as used herein are interchangeable.

The terms "second mean HRKc", "HRKc-$_{m2}$" and "HRKc-$_{M2}$", as used herein are interchangeable.

The terms "mean LRKc", "LRKc mean", "LRKc-$_m$", and "LRKc-$_M$", as used herein are interchangeable.

The terms "low resolution Kc$^{NRT}$" and "LRKc$^{NRT}$" as used herein are interchangeable.

The terms "high resolution KC$^{NRT}$" and "HRKc$^{NRT}$" as used herein are interchangeable.

The terms "near real time combined Kc value", "combined near real time Kc" and "CKc$^{NRT}$" as used herein are interchangeable.

The terms "reference crop coefficient curve" and "RCCC" as used herein are interchangeable.

The terms forecast "Kc crop coefficient" and "FKc" as used herein are interchangeable.

The terms forecast "initial growth period" and "IGP" as used herein are interchangeable.

The terms forecast "developmental growth period" and "DGP" as used herein are interchangeable.

The terms forecast "middle growing period" and "MGP" as used herein are interchangeable.

The terms forecast "late growth period" and "LGP" as used herein are interchangeable.

The terms "Kc middle growing period" and "Kc$^{MID}$" as used herein are interchangeable.

The terms "Kc threshold during the middle growing period" and "ThrKc$^{MID}$" as used herein are interchangeable.

The terms "Kc value at the end time of the late growing period" and "Kc$^{LGPe}$" as used herein are interchangeable.

The terms "time at the start of the MGP" and "$t_{MGPs}$" as used herein are interchangeable.

The terms "time at the start of the LGP" and "$t_{LGPs}$" as used herein are interchangeable.

The terms "most recent Kc$^{NRT}$ mid or middle growing period" and "MGPKc$^{NRT}$(r)" as used herein are interchangeable.

The terms "last Kc$^{NRT}$" and "Kc$^{NRT}t_L$" as used herein are interchangeable.

The terms "time at the end of the LGP" and "$t_{LGPe}$e" as used herein are interchangeable.

The terms "surface reflectance" and "SR" as used herein are interchangeable.

The terms "High Resolution Satellite Surface Reflectance" and "H-SR" as used herein are interchangeable.

The terms "Low Resolution Satellite Surface Reflectance" and "L-SR" as used herein are interchangeable.

The terms "Top of Atmosphere" and "TOA" as used herein are interchangeable.

The terms "High Resolution Satellite Top of Atmosphere" and "H-TOA" as used herein are interchangeable.

The terms "Low Resolution Satellite Top of Atmosphere" and "L-TOA" as used herein are interchangeable.

As used herein, the term $t_x$ is defined as: a time (t) incremented by a discrete time value (x) which is represented by $t_x$.

As used herein, the term $t_{nx}$ is defined as: a time (t) incremented by a plurality (n) of discrete time values (x) which is represented by $t_{nx}$.

As used herein, the term $t_f$ is defined as: a forecasted future time (t).

As used herein the term "polygon" is a plane figure that is bounded by a finite chain of straight line segments closing in a loop to form a closed polygonal chain or circuit. These segments are called its edges or sides, and the points where two edges meet are the polygon's vertices (singular: vertex) or corners.

As used herein "polygon body" is the interior of the polygon.

As used herein "polygon boundary" or "polygon boundaries" are the edges or sides of the polygon where the width of the polygon boundary is defined by the user.

The term "field" is used herein in its broadest scope and refers to a planted area. According to certain exemplary embodiments, the plants are of one or more crop species, including annual plants, perennial plants, herbaceous plants and trees. According to certain exemplary embodiments, the field is planted with a single crop species. It is however to be explicitly understood that the term "field" can also refer to an area at least partially covered with natural vegetation. A filed can comprises one or a plurality of subplots.

The terms "subplot" "zone" "managing zone" and "irrigation block" are used herein interchangeably and refer to a planted area controlled by a single irrigation operation unit. Any basic and/or the smallest irrigation operation unit as is known in the art can be used according to the teachings of the present invention. According to certain exemplary embodiments, the single irrigation operation unit is a valve. According to certain embodiments, the subplot is located within a field.

As used herein, the term "high resolution data" refers to remote sensing data obtained for high-resolution pixel size after atmospheric correction. As used herein, "high resolution pixel size" refer to pixel size equal to or below 30 m×30 m. According to certain embodiments, the high-resolution pixel size is from 0.01 mm×0.01 mm to 30 m×30 m. According to some embodiments, the high-resolution pixel size is from 0.01 mm×0.01 mm to 20 m×20 m, or from 0.01 m×0.01 m to 10 m×10 m. According to certain embodiments, the high-resolution pixel size is from 0.01 m×0.01 m to 6 m×6 m.

As used herein, the term "low resolution data" refers to remote sensing data obtained for low-resolution pixel size or for imagery data without atmospheric correction. As used herein, the term "low resolution pixel size" refer to pixel size over 30 m×30 m.

The terms "irrigation operation unit" and "irrigation controller" are used herein interchangeably and refer to an apparatus capable of adjusting the water flow from a water source. According to certain exemplary embodiments, the irrigation controller is a valve. The irrigation operation unit or the irrigation controller may include further irrigation elements such as a drip irrigation system, sprinklers, and the like As used herein, "reference data" refers to historical data from previous growing seasons or periods (e.g. growing seasons before the present growing season). The expressions "reference data", "historical data", and "archive" may be used interchangeably.

The terms "growing period" and "growing season" are used herein interchangeably, and refer to the time of a crop growth cycle or a part thereof. The growing period is crop specific, and accordingly its start and/or end points may vary for each crop. According to certain embodiments, the growing period start point is at seeding or planting. According to other embodiments, when the crop is a perennial crop, particularly tree, the growing period start point is at bud break or after harvesting the yield of a previous growing period. According to certain embodiments, the growing period end point is at harvest and/or senescence of the crop plants. According to certain embodiments, the growing period cycle includes an initial growing period (IGP), development growing period (DGP), middle growing period (MGP) and late growing period (LGP).

As described hereinbelow, the term "time" refers to a calendar day, to a time and date, to a day number as counted from the start of the growing season or within periods of the growing season, to the time as measured from the start of the growing season or within periods of the growing season, or to growing degree day (GDD).

As used herein, the term "about" means approximately, in the region of, roughly, or around. A parameter or quantity is said to be "about", or equal to "about", a numerical value (e.g. an area equals about 100 m$^2$) when it is within a range, thereby extending the boundaries above and below the numerical values set forth. In general, the term "about" is used herein to modify a numerical value above and below the stated value by a variance of 10%. According to some embodiments, "about" is used herein to modify a numerical value above and below the stated value by a variance of 15%. According to some embodiments, "about" is used herein to modify a numerical value above and below the stated value by a variance of 20%.

The systems and methods of the present invention are applicable to agricultural crops at a variable spatial resolution, including spatial resolution of irrigation blocks (subplots). The area of the irrigation blocks would depend on the user (crop grower) needs, the resolution of the obtained spectral data and area of the entire field. According to some exemplary embodiments, the subplot area is equal or greater than 1 m$^2$.

According to certain embodiments, the system and methods of the present invention include several components, defining parameters and/or activities required to generate the irrigation plan.

Remote Sensing in Agriculture

Remote sensing is the collection of data from a distance; that is, without physical contact between the sensor and the object being measured. Although there are many types of remotely sensed data, the one most commonly associated with the term remote sensing is photography collected from aircraft or satellites. Above-ground imaging has played a major role in agriculture over the last fifty years. Recent advancements in sensor technology has enabled remote sensing in agriculture to include: hand-held devices which measure how plants reflect certain portions of the light spectrum, hand-held devices that measure temperature, single or multiple sensors mounted on farm implements and sprinkler systems, and airborne and space borne digital collection systems that measure wavelengths of light visible and not visible to human vision. All of these systems can be used to measure different parameters of plant growth. This ability to measure the response of plants to wavelengths of light, within and beyond human vision, coupled with its non-invasive nature has put remote sensing in the forefront of agricultural research.

There are basically two types of remotely sensed systems available for land cover evaluation: active systems and passive systems. Active systems (i.e., radar, sonar, laser and seismic) transmit energy and measure energy response. The amount of energy reflected back to the sensor gives the scientist insight into the type of object being measured. Passive systems on the other hand, do not provide their own source of energy and rely solely on other sources of object illumination (i.e., typical reflective based cameras/scanners and thermal imaging systems). The primary source of energy for most passive systems is the sun, which emits energy in all possible wavelengths called the electromagnetic spectrum. According to certain exemplary embodiments, the teachings of the present invention refers to passive systems using the Sun as their source of energy. However, it should be understood by those of ordinary skill in the art that the initial raw data could be obtained by any method known in the relevant art, including both passive and active remote sensor systems.

Spectral Resolution

The spectral resolution of imaging systems simply indicates how many portions of the electromagnetic spectrum are being measured at a given time. This number of bands can range from only one band (termed panchromatic) to multiple bands (termed multispectral). Equally important to the number of bands, is the band-widths and the exact positioning of the bands along the spectrum. Multispectral imaging systems collect reflectance data using band widths rarely overlapping each other, the electromagnetic spectrum. The band placement of imaging systems generally relates to specific portions of the spectrum where soil, water, or vegetation is behaving in a unique way.

Today's commercially-available Earth observing satellite systems cover areas of thousands of square kilometers with pixels that define the image resolution from decimeters to tens of meters. The pixel size is an important consideration because it determines the resolution at which an area of interest can be evaluated. The area on the ground that a pixel correlates with (pixel size) is determined by the sensor's optics and the altitude of the imaging system. Typically, the larger the pixel size, less detailed resolution of the image is available. The spatial resolution for imaging systems mounted on commercial space borne satellites varies between 3 meters and several kilometers, depending on the application. Unmanned aerial vehicles flying relatively close to the ground can achieve very high spatial resolutions.

The present invention is based in part on combining data received from high resolution sensors and from low resolution sensors.

Top of Atmosphere (TOA) Spectral Radiance and Surface Reflectance

In remote sensing imagery, pixel values are referred to as Digital Numbers (DN). Obtaining accurate quantitative information from multispectral satellite data requires the conversion of raw digital numbers (DN) to reflectance. Sensor characteristics, illumination geometry and atmospheric conditions affect the signal received by a multispectral satellite sensor. The signals are also influenced by various factors including the amount of light flowing through the sensor, the electronics within the sensor as the gain of the detectors and the analog to numeric converter, each of which may add an amount of error.

Depending on the season, the light and atmospheric conditions, the position of the sun or the sensor internal parameters, these DN can drastically change for a given pixel (apart from any ground change effects). Moreover, these effects are not uniform over the spectrum: for instance, aerosol amount and type has usually more impact on the blue channel.

Therefore, it is advisory to calibrate the pixel values before any physical interpretation is made. In particular, this processing is mandatory before any comparison of pixel spectrum between several images (from the same sensor or from different sensors) is made.

Calibrated values are called surface reflectivity, which is a ratio denoting the fraction of light that is reflected by the underlying surface in the given spectral range. As such, its values lie in the range between [0,1]. For convenience, images are often stored in thousandth of reflectivity, so that they can be encoded with an integer type. Two levels of calibration are typically distinguished:

The first level (Level 1) is called Top of Atmosphere (TOA) reflectivity. It takes into account the sensor gains, the sensor spectral response and the solar illumination The second level (Level 2) is called Top of Canopy (TOC) reflectivity. In addition to sensor gain and solar illumination, it takes into account the optical thickness of the atmosphere, the atmospheric pressure, the water vapor amount, the ozone amount, as well as the composition and amount of aerosol gasses.

Radiometric Data Correction and Smoothing

Generation of Calibration Coefficients

Radiometric correction is the method of accounting for specific sources of error in collected multispectral imagery data. An atmospheric models or empirical line method may be used to calibrate multispectral imagery. In both options, correction for illumination geometry and atmospheric attenuation in the imagery is achieved with in-situ knowledge of the local weather and topography, or with surface reflectance values measured from field targets.

An important aspect of computing a near real time crop coefficient truly representing the crop status according to the teachings of the invention relies on indices calculated using temporal imagery. Therefore, a method of calibration is important to realizing the invention. According to certain embodiments, calibration of the remotely sensed data uses the Empirical Line Method created to generate the calibration coefficients for each image, using techniques known in the art. The Empirical Line Method calibrates images between different satellites images acquired on different dates and by different sensors under differing weather condition. Images are converted to surface reflectance products through radiometric corrections (atmospheric, and, ideally, also including topographic corrections) as described for example, in Padro et al. (Padro J C et al., 2017. Remote Sens 9: 1319; doi:10.3390/rs9121319).

Smoothing

Obtaining the spectral data from multiple satellites and at a plurality of time points may result in a high noise-to-signal ratio which would lead to imperfect transformation of vegetative index to Kc values. According to certain embodiments, the method of the present invention further comprises applying a smoothing algorithm to reduce the noise-to-signal ratio of the remote sensing signal data. According to certain embodiments, the smoothing method applies third order polynomial regression between the imagery outputs from a specific location and the days of these images. The inventors of the present invention have found that correcting signal data obtained at a time t using data obtained only before time t, and assigning weight to the past data corresponding to the length of the entire growth period, improves the signal-to-noise ratio significantly.

According to certain exemplary embodiments, the smoothing method can employ the Savitzky-Golay filter or a 3th order polynomial regression with the following considerations:

1. Satellite weight—representing the quality of the sensor. For example, Landsat-8 weight is taken as 0.5 and Sentinel-2 weight is taken as 0.25.
2. Time Distance Weight—a factor for each image taking in account the importance of the past imagery data. For example, when the current image (i.e. an image taken at time t) factor is 1.0, images received at previous time points classified as having high importance are given a factor of 0.99, 0.98, 0.97 for the first, second and third previous time points respectively, and a factor of 0.90, 0.80. and 0.70 for the first, second and third previous time points when classified as having low importance. This factor is determined according to the intensity of the crop growing season, where crops with at least several months of growing season will received high-importance weights. In contrast, short cycle crops such as Alfalfa (with growing cycle of about 25-45 days), will receive low factor weights.
3. Maximum days to consider—the number of days to account when utilizing the regression equation. For crops that have short growing season, or crops harvested every couple of weeks like, e.g. alfalfa, this factor is set in the range of 25 to 35 days, specifically 25 or 35 days. For most other crops, with one growing season per a year, the factor is typically set to 120 days.

Crop Coefficient (Kc)

Providing precise irrigation recommendation requires, inter alia, obtaining Kc values which truly represents the physical and physiological status of the crop. In the Penman-Monteith equation described above ($ETa=ET0*Kc$), the crop coefficient, Kc, is basically the ratio of the crop ETa to the reference ET0, and it represents an integration of the effects of four primary characteristics that distinguish the crop from reference grass. The primary parameters are crop height, the reflectance of the crop-soil surface, the crop canopy resistance to vapor transfer, which is mainly affected by the leaf area, and evaporation from the soil.

The present invention provides a frequent near real time crop coefficient values throughout a growing period of a crop. According to certain embodiments, the present invention performs a Kc algorithm within a computing environment. The algorithm provides near real time, representative Kc values at a frequency of at least once a day and in particular also in times in which high resolution imagery data are not available. The Algorithm further provides forecasted Kc values. These values can then be used for computing ETa and providing current and forecast irrigation recommendations.

Vegetative Indices

The remote sensing data calibrated as described hereinabove are used to derive at least one vegetative index. The most common crop canopy reflectance data used for computing a vegetative index include bands covering the blue (B), green (G), red (R), red-edge (RE702, RE738), near-infra-red (NIR) and the two short-wave-infrared (SWIR1, SWIR2) bands. According to certain embodiments, the remote sensing derived indices include, but are not limited, to the following:

Normalized difference vegetation index (NDVI), defined via $NDVI=(NIR-R)/(NIR+R)$;

Enhance vegetation index (EVI), defined via $EVI=2.5*((NIR-R)/(NIR+6*R-7.5*B+1)$;

Wide Dynamic Range Vegetation Index (WDRVI), defined via $WDRVI=(0.2*NIR-R)/(0.2*NIR+R)$;

Modified NDVI (mNDVI), defined via $mNDVI=(NIR-R)/(NIR+R-SWIR2)$;

Red-Green simple ratio (R/G), defined via $R/G$;

Blue-Red simple ratio (B/R) defined via $B/R$;

Red edge inflection point (REIP) defined via $REIP=700+40*(((NIR+R)/2)-RE702)/(RE738-RE702)$;

Visible Atmospherically Resistant Index (VARnir), defined via $VARnir=(NIR-R)/(NIR+R-B)$.

The NDVI and EVI particular ratios play on the inverse relationship between the red and near infrared with regard to healthy green vegetation versus bare soil. As a crop begins to emerge, there is more chlorophyll production, causing a decrease in red reflectance. As well, there is an increase in biomass or cell structure causing an increase in near infrared reflectance. This inverse relationship is captured in an NDVI resulting in a high value (near 1.0 for healthy green vegetation) and a very low number for stressed or unhealthy vegetation (near 0.0). Spectral reflectance is dimensionless being a ratio of the reflected radiation over the incoming radiation in the corresponding spectral band. Hence, the spectral reflectance assumes values between 0.0 and 1.0. By design, the NDVI thus varies between −1.0 and +1.0.

Reference Crop Coefficient Curve (RCCC)

The RCCC during the growing period represents changes in vegetation and ground cover reflected by the variations in the crop coefficient Kc. The reference crop coefficient curve may include data according to the FAO recommendations, or pre-determined data from other sources. Using the tabular values (reference Kc values), only three values for Kc are typically required to describe and construct the crop coefficient curve after an initial growing period (IGP) stage. These are the Kc at the start of the developmental growing period (DGP), (KcDGPs), the Kc at the start of the middle growing period (MID), ($Kc^{MIDs}$), which is typically constant throughout the MID, and the Kc at the end of the late growing period (LGP), (KcLGPe).

Forecast Kc

The present invention provides methods and systems for forecasting Kc values used in calculating precise irrigation needs of a crop in a specified area. According to certain embodiments, the present invention performs a Kc algorithm within a computing environment. The algorithm provides forecasting data used ahead for the Kc and accordingly the required amount of water delivery based upon a combination of statistical values of historical crop-specific data and data obtained for the crop during the growing season.

Methods

The present invention now discloses novel computational method to determine near real time Kc values, including at time periods in which high resolution imagery data are available at a low frequency which does not meet the agricultural needs of true representation of the crop status. The following methods are used to determine a near-real time combined Kc value ($CKc^{NRT}$) using High- and Low-resolution satellites.

Determining High Resolution Kc (HRKc) Value

An initial Pre-Processing calibration where High Resolution Images having pixel sizes ≤30×30 meters in area uses the Empirical Line Method as described hereinabove to obtain processed data. User defined boundaries of at least one polygon, typically being a subplot, contains a plurality of pixels, each pixel representing a ground area within the polygon for which Kc value is calculated. HRKc computation for the polygon requires several calculation steps. Data of area(s) void of vegetation are first removed. The data may include processed pixels designated by the imagery sensor to be void of vegetation, which are then converted to Kc values and/or Kc values computed based on the original processed imagery data which are <0.3, <0.25, <0.2, or <0.15. Area(s) void of vegetation include bare ground which can also be the exterior edge of fields, or sometimes paths or roads, or structures within a field. From this first set of HRKc values, a mean (HRKc-$_{m1}$) and a standard deviation (STD) are calculated. The first set of HRKc values now undergoes further testing to obtain a second set of HRKc values. Each Kc value from the first set of HRKc values is now further compared to a minimum or maximum threshold to obtain a second set of HRKc values where the minimum Kc value is equal to or greater than the mean minus one STD. The maximum valid Kc value is equal to or less than the mean plus two STD's. Pixels below the minimum or above the maximum are rejected and thrown away. This is referred to as removing the low and high Kc values. From the second set of HRKc values in each polygon boundary of a sub field, the mean of all HRKc pixel values is re-calculated. These are referred to as HRKc-$_{m2}$ for each sub-plot.

Figure 5:
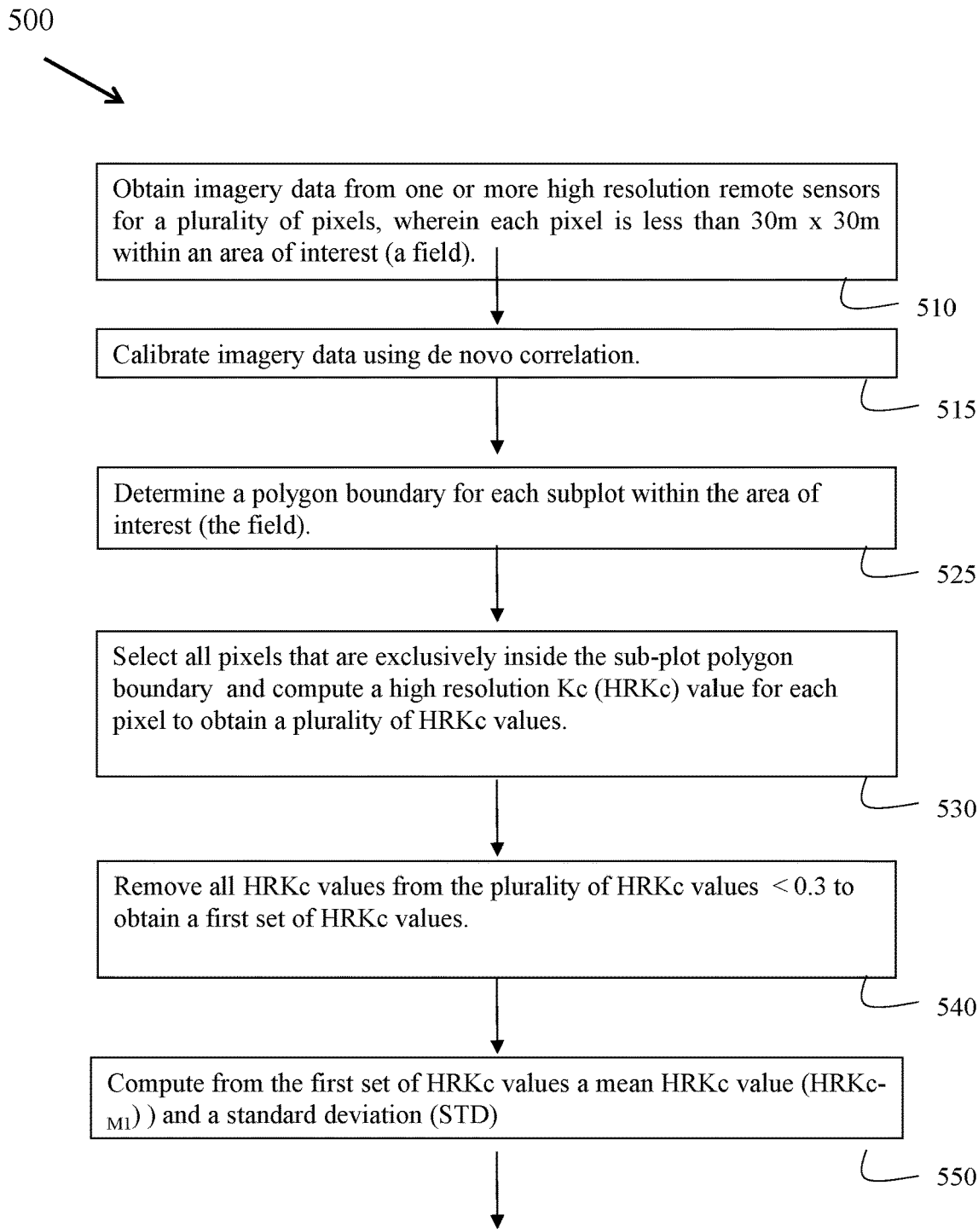
FIG. 5 presents a flowchart of a method for determining high resolution crop coefficient (HRKc) value at a certain time, according to certain embodiments of the present invention.

FIG. 5 depicts a flow chart of an example method 500 to compute high resolution Kc (HRKc). Within a computing environment comprising at least one computer processor and at least one computer-readable storage medium operably coupled to the computer processor and having program instructions stored therein and data specifying a boundary of the field and/or of at least one subplot, the computer processor being operable to execute the program instructions to generate a high resolution near real time (NRT) crop coefficient ($HRKc^{NRT}$) at a time t by which Method 500 comprises:

A step 510 wherein remote sensing imagery data from one or more high spatial resolution remote sensors are received, typically at a time t, wherein the imagery data comprise values associated with a plurality of pixels, each pixel is equal to or less than 30 m×30 m;

A step 515 wherein the imagery data are calibrated using de novo correlation, exemplified by the Empirical Line Method;

A step 525 wherein a polygon boundary for the field and/or each subplot within the field is determined;

A step 530 wherein all pixels that are exclusively inside the subplot polygon boundary are selected and a high-resolution Kc (HRKc) value is computed for each pixel to obtain a plurality of HRKc values;

A step 540, wherein HRKc values equal to or greater than a number in the range of 0.15 to 0.3 are selected from the plurality of HRKc values, to obtain a first set of selected HRKc values;

A step 550 wherein, from the first set of selected HRKc values a first mean HRKc value (HRKc-$_{M1}$) and a standard deviation (STD) are computed;

A step 560 wherein from the first set of HRKc values any of which is less than a first threshold being the sum of HRKc-$_{M1}$ minus one STD is removed to obtain a second set of HRKc values;

A step 570 wherein from the second set of HRKc values any of which is greater than a second threshold value being the sum of HRKc-$_{M1}$ plus two STD's is removed to obtain a third set of HRKc values;

A step 580 wherein from the third set of selected values a second mean HRKc value (HRKc-$_{M2}$) is computed; and A step 590 wherein $HRKc^{NRT}$, typically at time t ($HRKc^{NRT}$(t)) is set to equal HRKc-$_{M2}$.

Determining Low Resolution Kc (LRKc) Value

An initial Pre-Processing calibration for Low Resolution Images having pixel sizes ≥30×30 meters in area using the Empirical Line Method is performed as described hereinabove. User defined boundaries of a polygon, typically a field, may contain one or more pixels.

Figure 6:
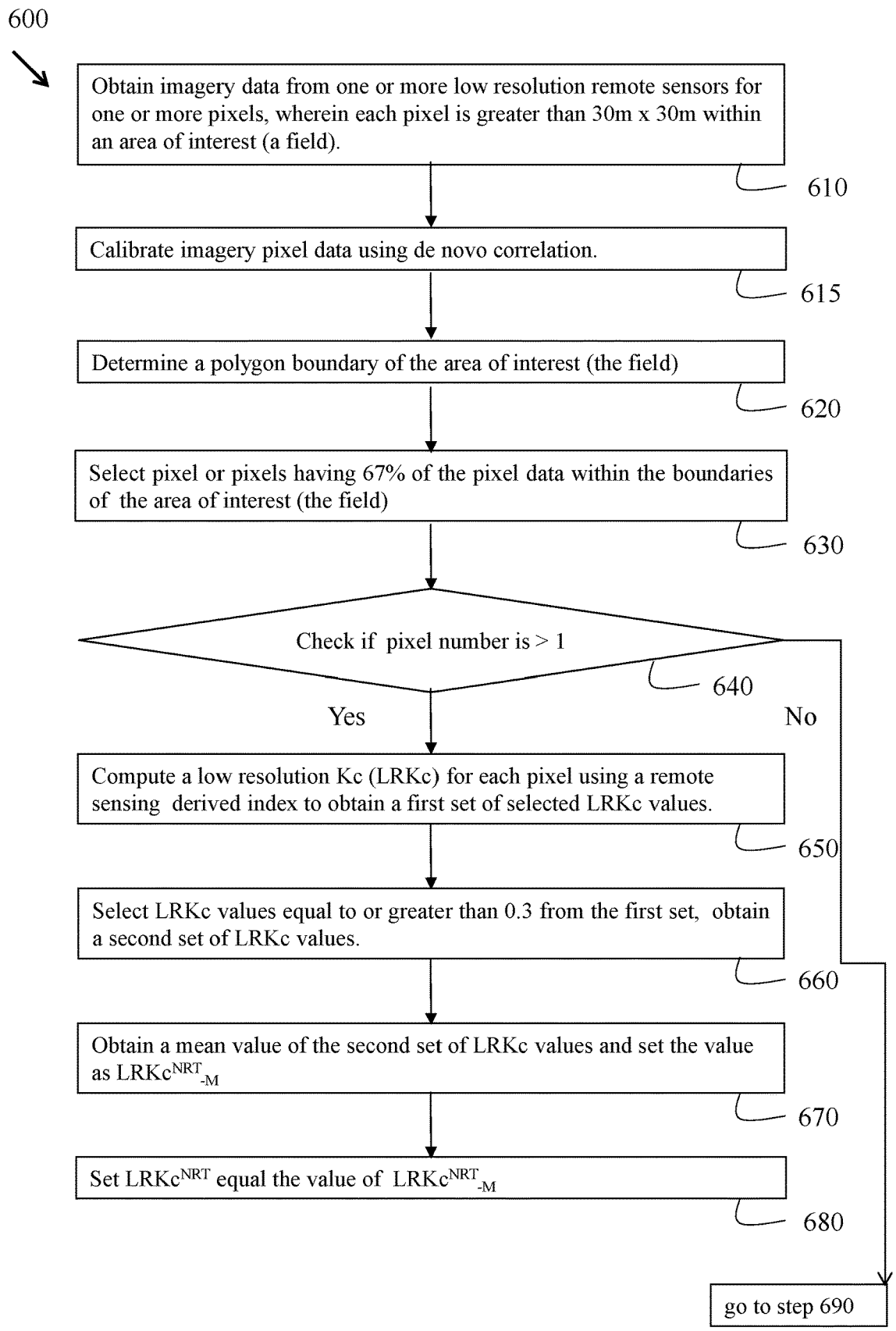
FIG. 6 presents a flowchart of a method for determining a low-resolution crop coefficient (LRKc) value at a certain time, according to certain embodiments of the present invention.
Figure 6:
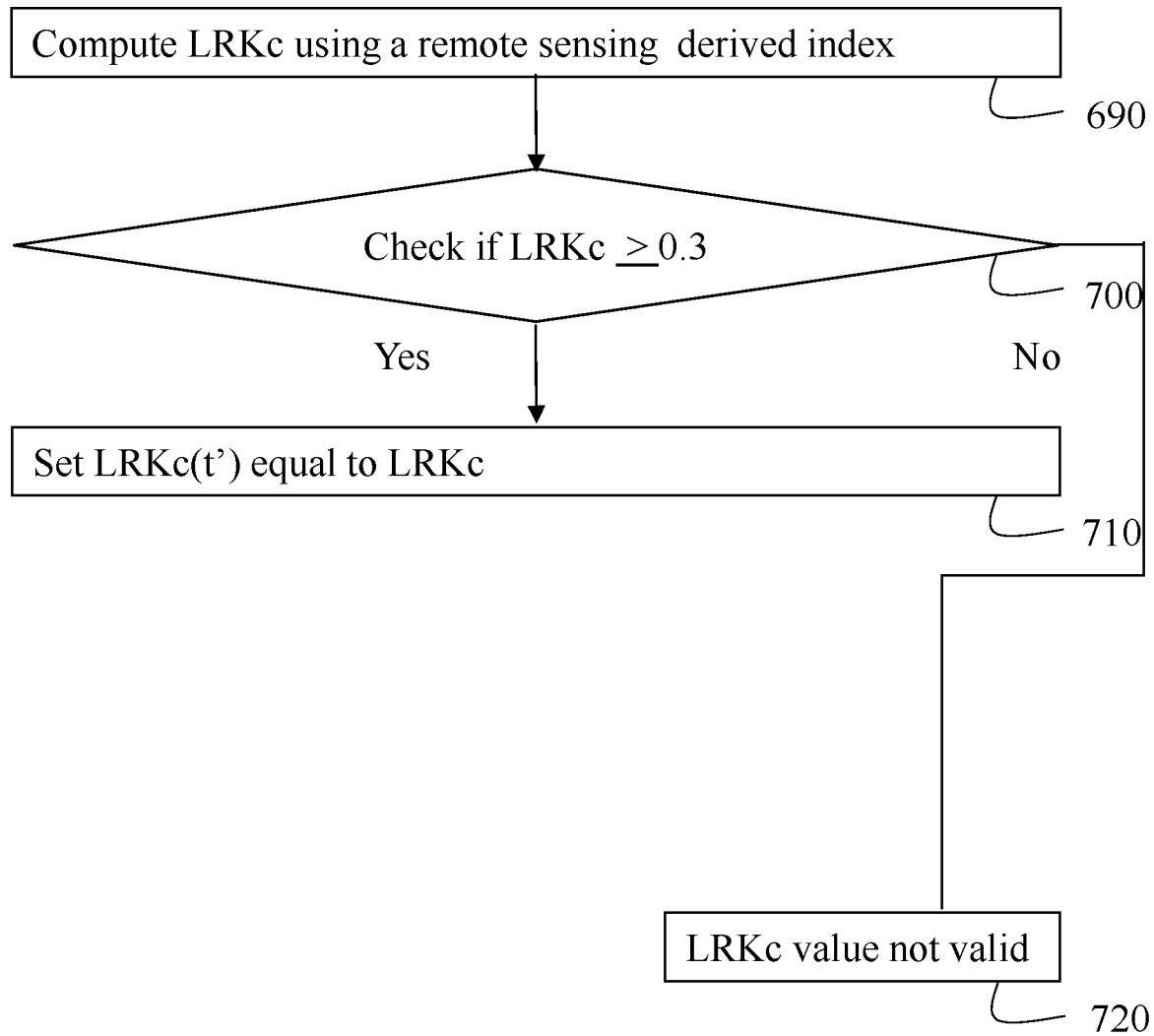

FIG. 6 depicts a flow chart of an example method 600 to compute a low resolution near real time Kc value ($LRKc^{NRT}$) within a computing environment as described hereinabove. $LRKc^{NRT}$ is typically computed at a time t'($LRKc^{NRT}$(t')) wherein remote sensing imagery data may be available from both, high- and low-resolution sensors or low-resolution sensors only. Method 600 comprises:

A step 610 wherein remote sensing data from one or more low spatial resolution remote sensors are received, typically at time t', wherein the imagery data comprise values associated with at least one pixel, each pixel is greater than 30 m×30 m;

A step 615 wherein imagery data are calibrated using de novo correlation, exemplified by the Empirical Line Method;

A step 620 wherein a polygon boundary for the field is determined;

A step 630 wherein at least one pixel having 67% of the pixel data within the boundaries of the field is selected; and A step 640 wherein it is checked if the pixel number is greater than 1.

Contingent on the pixel number is greater than 1, Method 600 further comprises:

A Step 650 wherein a LRKc value is computed for each pixel using a remote sensing derived index to obtain a first set of LRKc values;

A step 660 wherein LRKc values equal to or greater than a number in the range of 0.15 to 0.3 are selected from the first set to obtain a second set of selected LRKc values;

A step 670 wherein a mean of the selected Kc values is computed to obtain $LRKc^{NRT}_{-M}$; and A step 680 wherein $LRKc^{NRT}$, typically at time t' ($LRKc^{NRT}(t')$) is set to equal $LRKc^{NRT}_{-M}$.

Contingent on the pixel number equals 1, Method 600 further comprises:

A step 690 wherein Kc value is computed for the pixel using a remote sensing derived index; and A step 700 wherein it is checked if the Kc value is equal to or greater than a number in the range of 0.15 to 0.3.

Contingent on the Kc value is equal to or greater than a number in the range of 0.15 to 0.3, Method 600 further comprises:

A Step 710 wherein $LRKc^{NRT}$, typically at time t' ($LRKc^{NRT}(t')$) is set to equal LRKc.

Contingent on the Kc value is less than a number in the range of 0.15 to 0.3.

A Step 720 setting LRKc not valid.

Determining Combining KC Value (CKc) from a Plurality of Satellites

As there is an unmet need for the integration of satellite data, such that a plurality of satellites transmitting image data over a unity of area increases the availability of satellite coverage for any given day; and where revisit cycles of high resolution satellites are often greater than 72 hours, the present invention provides a method for employing data received from a plurality of satellite to satisfy a long felt need to provide near real time Kc values at a frequency of about once a day.

Figure 7:
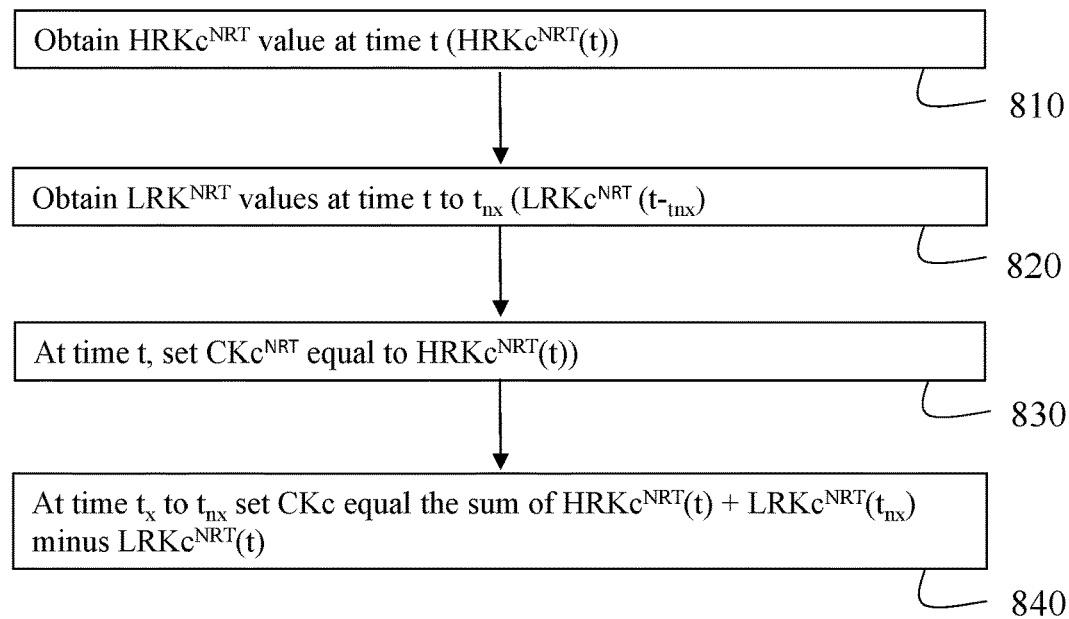
FIG. 7 presents a flowchart of a method for determining combined crop coefficient (CKc) value at a certain time, according to certain embodiments of the present invention.

FIG. 7 depicts a flow chart of an example method 800 to determine a combined Kc value from a plurality of satellites, including satellites providing high- and low-spatial resolution imagery data at a time period t to $t_{nx}$, wherein high-resolution imagery data are available only at time t, within a computing environment as described hereinabove.

The value combined $Kc^{NRT}(t)$ is obtained by computing $CKc^{NRT}$ during the time period t to $t_{nx}$ ($t-t_{nx}$) by:

A step 810 wherein at time t, $HRKc^{NRT}$ value t ($HRKc^{NRT}(t)$) is set according to the steps of Method 500;

A step 820 wherein at time t to $t_{nx}$ $LRKc^{NRT}$ values ($LRKc^{NRT}(t-t_{nx})$) are set according to the steps of Method 600;

A step 830 wherein $CKc^{NRT}$ ($HRKc^{NRT}(t)$) is set to equal $HRKc^{NRT}(t)$; and A step 830 wherein at each time point $t_x$ to $t_{nx}$, with each time point incremented by a discrete time amount of x, computing $LRKc^{NRT}(t_x-t_{nx})$ and setting the $CKc^{NRT}$ to equal the sum of $HRKc^{NRT}(t)+[(LRKc^{NRT}(t_{nx})$ minus $(LRKc^{NRT}(t'))]$.

Determining Forecasted Kc (FKc)

The present invention further provides a novel method for computation of forecast Kc values (FKc) during an entire growth period. Published tabular Kc value, for examples those listed in FAO56, are used as reference values to compute FKc based on remote sensing data, which more accurately represent the actual Kc of a crop in a growing area.

FIG. 1 depicts a representative reference curve of Kc values along a growing period, which include an initial growing period (IGP); a developmental growing period (DGP); a middle growing period (MGP) and a late growing period (LGP).

FIGS. 2-4 and 8a-8d describes computation of FKc during a growing period.

Figure 2:
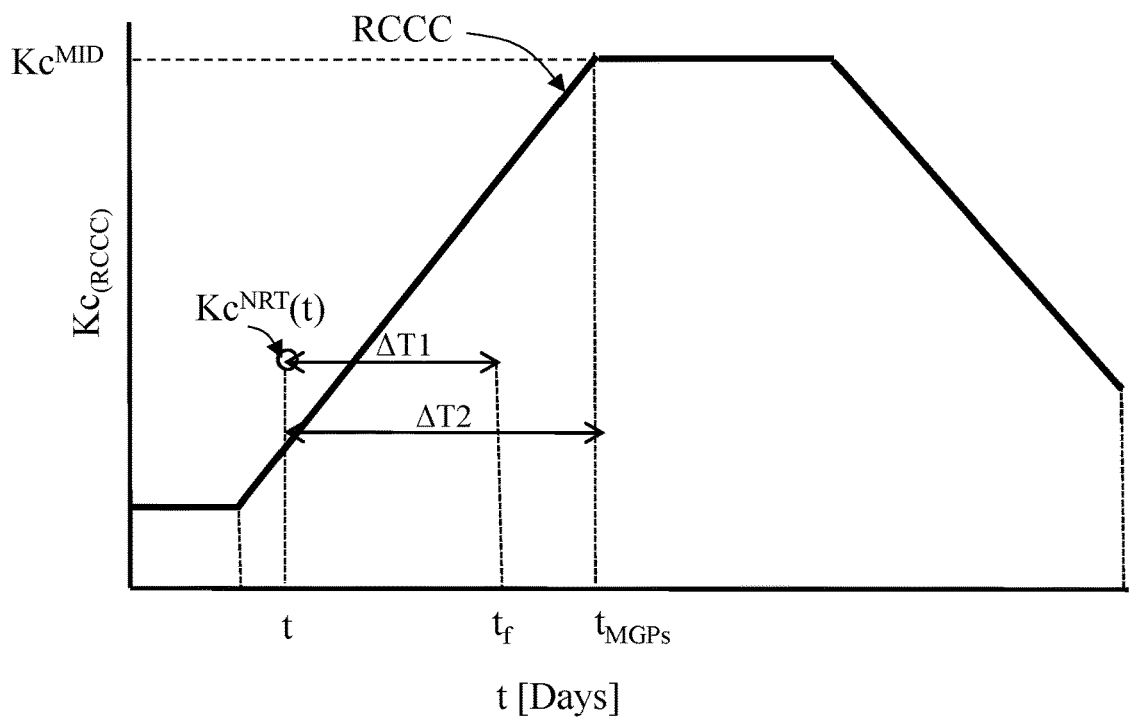
FIG. 2 schematically depicts the data points and parameters required to obtain a future crop coefficient (FKc) for a development growing period (DGP), according to certain embodiments of the present invention.

As used herein "$\Delta T_1$" as shown in FIG. 2 defines the number of days between time point t, wherein $Kc^{NRT}$, typically $CKc^{NRT}$ is obtained, and time point $t_f$, the time point set for obtaining a forecast $Kc^{NRT}$ ($FKc^{NRT}$).

As used herein "$\Delta T_2$" as shown in FIG. 2 defines the number of days between time point t as defined above and the time of the beginning of the MGP ($t_{MGPs}$).

Figure 4:
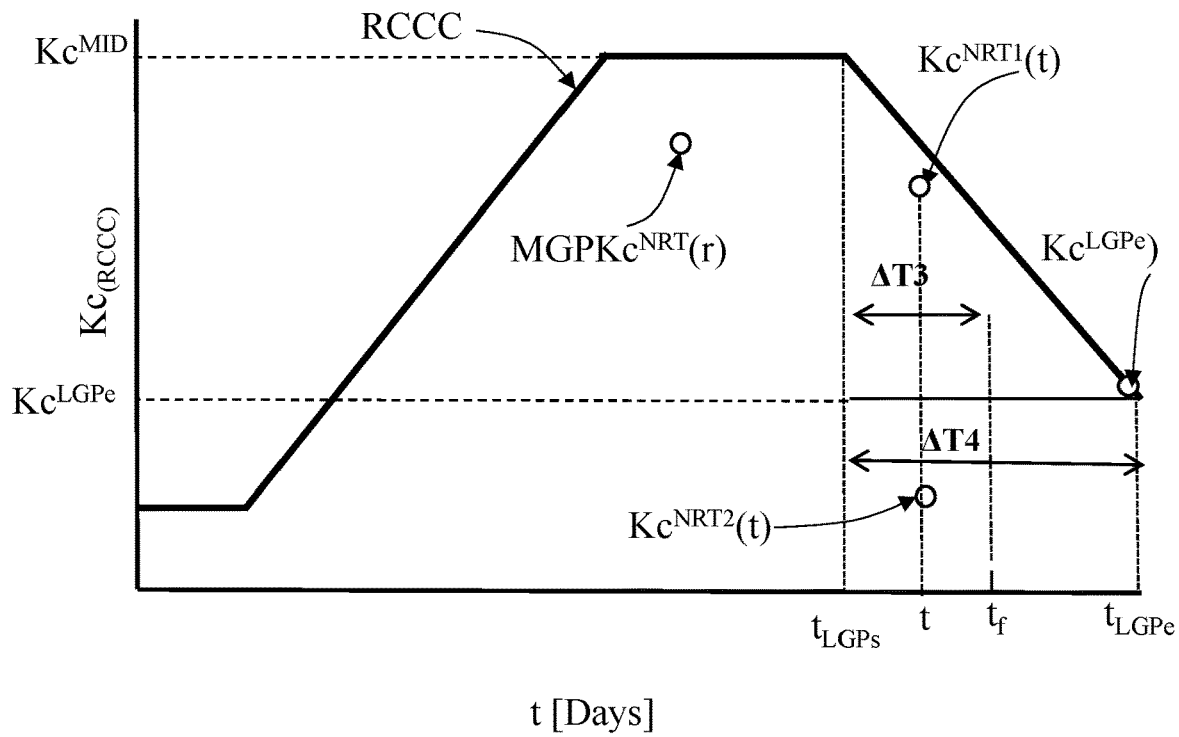
FIG. 4 schematically depicts the data points and parameters required to obtain a future crop coefficient (FKc) for a late growing period (LGP), according to certain embodiments of the present invention.

As used herein "$\Delta T_3$" as shown in FIG. 4 defines the number of days between the time of the beginning of the LGP ($t_{LGPs}$) and $t_f$ as defined above.

As used herein "$\Delta T_4$" as shown in FIG. 4 defines the number of days between $t_{LGPs}$ and the time of the end of the LGP ($t_{LGPe}$).

FIGS. 8a to 8d depict a flow chart of example methods 900, 1,000, 1100, and 1200 to compute FKc within a computing environment comprising at least one computer processor and at least one computer-readable storage medium operably coupled to the computer processor and having program instructions stored therein and data specifying a boundary of the field and/or at least one subplot thereof and a reference crop coefficient curve (RCCC) for the growing period, the computer processor being operable to execute the program instructions to generate the FKc by performing the steps of:

A step 910 wherein near real time Kc ($Kc^{NRT}$) at a time t ($Kc^{NRT}(t)$) is obtained as depicted in FIG. 5 or FIG. 7;

A step 920 wherein a forecasted future time $t_f$ for which the crop coefficient FKc is required is set as shown on FIG. 2;

A step 930 wherein it is checked if t and $t_f$ as shown in the FIG. 2 are within a period from the start of the initial growth period (IGP) to the start of the middle growing period (MGP) on the time axis of the RCCC:

Contingent on Step 930 being true, performing the steps depicted in FIG. 8b:

A step 1010 wherein parameter $Kc^{MID}$ is set as the maximal Kc value from the RCCC within the middle growing period (MGP) as shown in FIG. 2;

A step 1020 wherein parameter $\Delta T_1$ is set as shown in FIG. 2;

A step 1030 wherein parameter $\Delta T_2$ is set as shown in FIG. 2;

A step 1040 wherein FKc is set to equal the sum of $Kc^{NRT}(t)$ plus $((((Kc^{MID}-Kc^{NRT}(t))/\Delta T_2))*\Delta T_1)))$.

Figure 3:
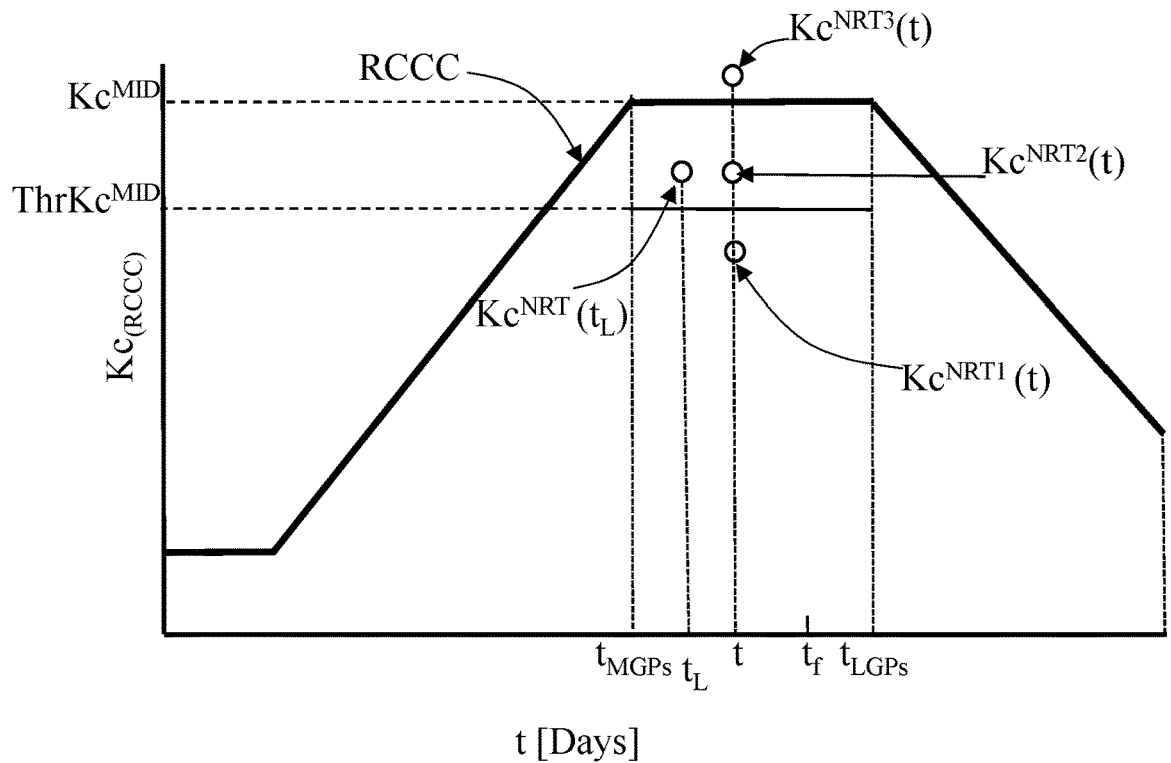
FIG. 3 schematically depicts the data points and parameters required to obtain a future crop coefficient (FKc) for a middle growing period (MGP), according to certain embodiments of the present invention.
Figure 8A:
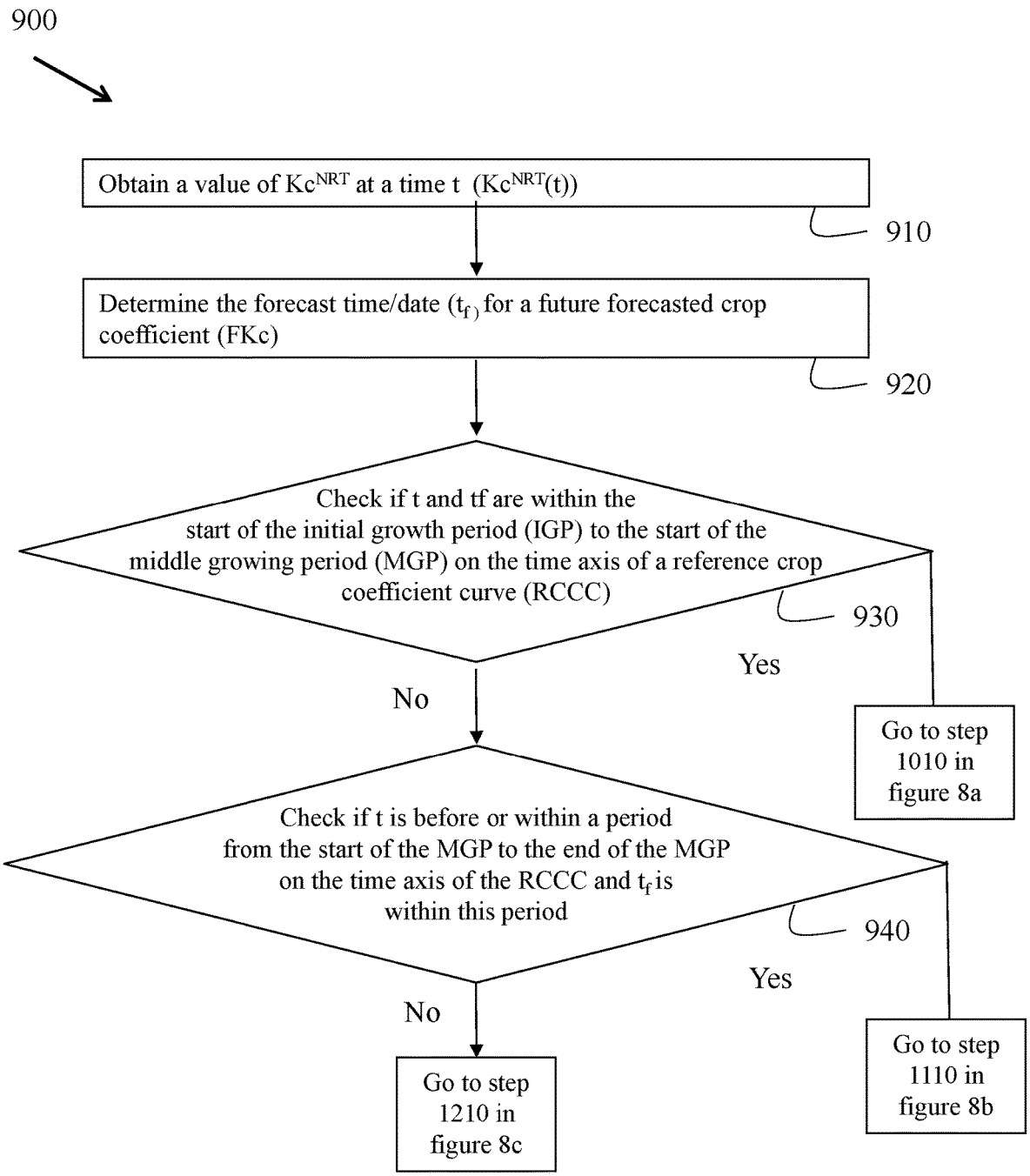
Figure 8C:
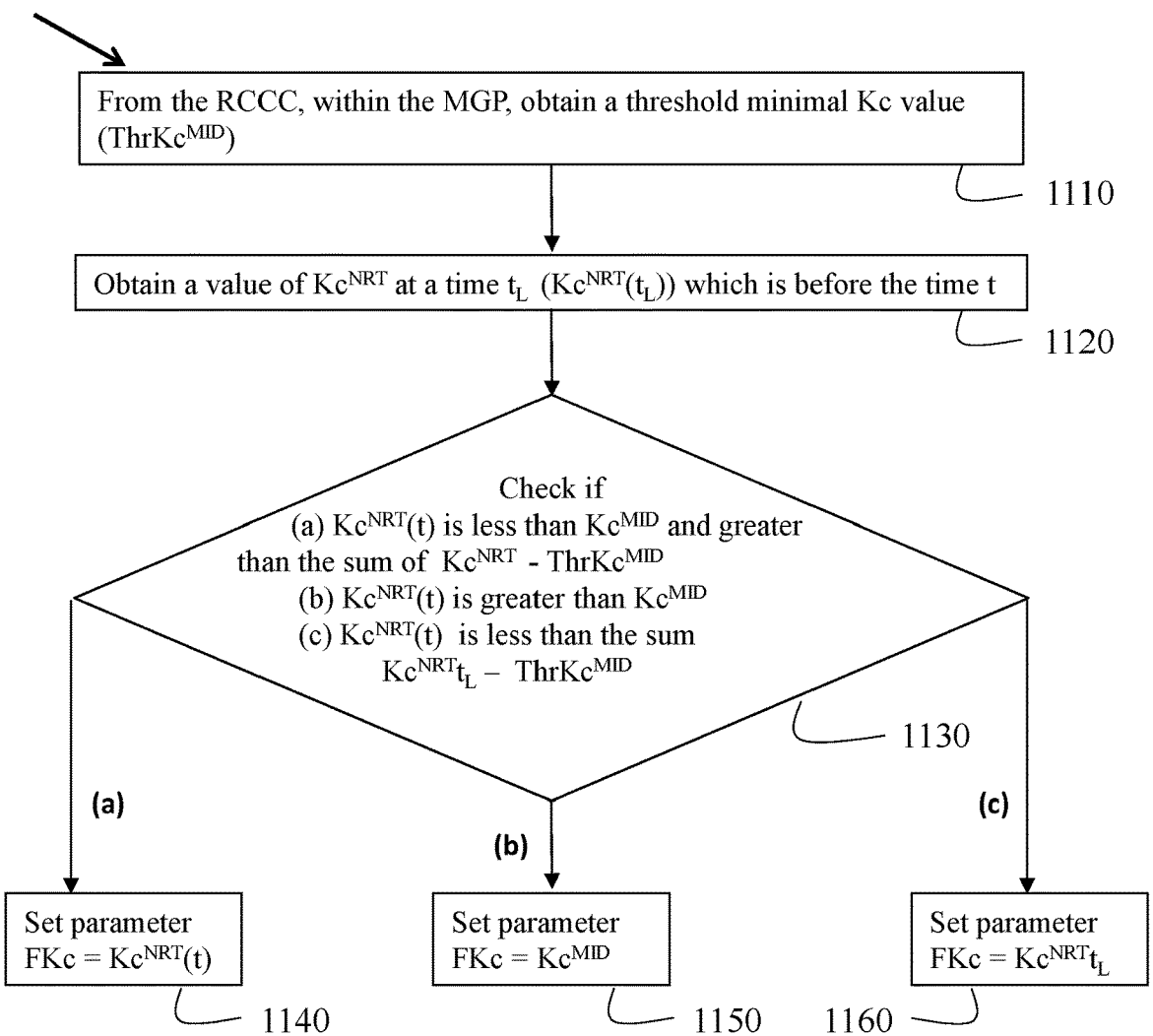
Figure 8D:
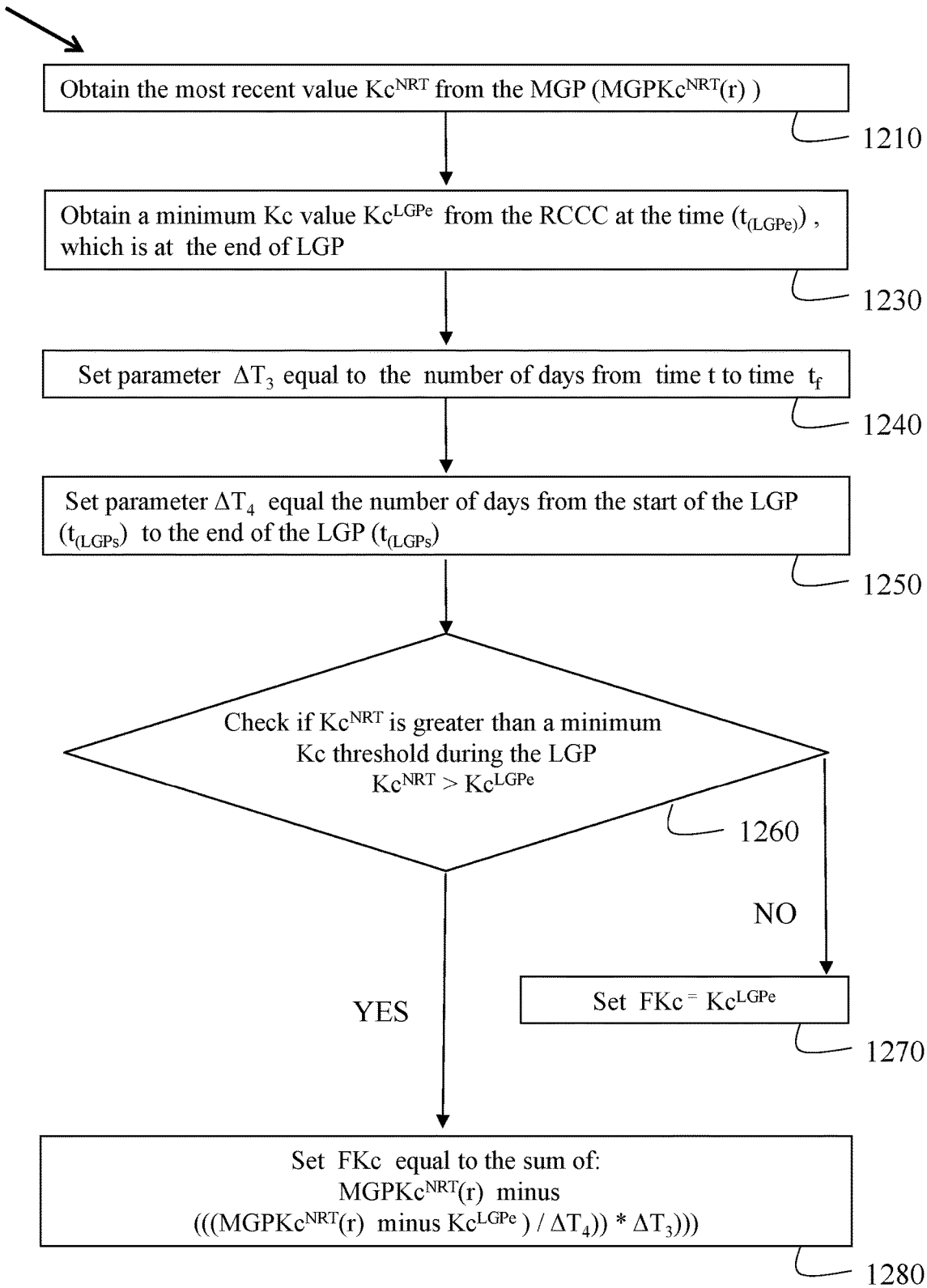

Contingent on Step 930 being False:

A step 940 wherein it is checked if t is before or within a period from the start of the MGP to the end of the MGP, which equal the time of the start of the LGP on the time axis of the RCCC curve as shown in FIG. 3 and that $t_f$ is within the period:

Contingent on Step 940 being true, performing the steps depicted in FIG. 8c:

A step 1110 wherein from the RCCC curve on FIG. 3 a threshold minimal Kc value (ThrKc$^{MID}$) for said period is obtained;

A step 1120 wherein Kc$^{NRT}$ at a time $t_L$ (Kc$^{NRT}t_L$) which is before the time t as shown on FIG. 3 is obtained;

A step 1130 wherein it is checked if:
  (a) Kc$^{NRT}$(t) is less than Kc$^{MID}$ and greater than the sum of Kc$^{NRT}$ minus ThrKc$^{MID}$ as exemplified in the point Kc$^{NRT2}$(t) shown on FIG. 3; or
  (b) Kc$^{NRT}$(t) is greater than Kc$^{MID}$ as exemplified in the point Kc$^{NRT3}$ (t) shown in FIG. 3; or
  (c) Kc$^{NRT}$(t) is less than the sum Kc$^{NRT}$t minus ThrKc$^{MID}$;

Contingent on Step 1130 (a) being True:
A step 1140 wherein FKc is set to equal Kc$^{NRT}$(t);
Contingent on Step 1130 (b) being True:
A step 1150 wherein FKc is set to equal Kc$^{MID}$;
Contingent on Step 1130 (c) being True:
A step 1160 wherein FKc is set to equal Kc$^{NRT}t_L$;
Contingent on Step 940 being False performing the steps depicted in FIG. 8d:

A step 1210 wherein the most recent Kc$^{NRT}$ value from the MGP (MGPKc$^{NRT}$(r)) is obtained;

A step 1230 wherein g a minimum Kc value is obtained from the RCCC at the end of the late growing period LGPe (Kc$^{LGPe}$) as is shown in FIG. 4;

A step 1240 wherein parameter $\Delta T_3$ is set as is shown in FIG. 4;

A step 1250 wherein parameter $\Delta T_4$ is set as is shown in FIG. 4;

A step 1260 wherein it is checked if Kc$^{NRT}$ is greater than a minimum Kc during the LGP (Kc$^{NRT}$>Kc$^{LGPe}$) as is shown in FIG. 4;

Contingent on Step 1260 being true:
A step 1270 wherein FKc is set to equal to the sum of MGPKc$^{NRT}$(r) minus (((MGPKc$^{NRT}$(r) minus Kc$^{LGPe}$)/$\Delta T_4$))*$\Delta T_3$))
Contingent on Step 1260 being False:
A step 1280 setting FKc to equals KC$^{LGPe}$.

The minimal threshold Kc value of the middle growing period (ThrKc$^{MID}$) is an empirical value, set as the lowest Kc value to be used throughout this period computed to reflect vegetation-related spectral data changes not related to evapotranspiration. According to certain embodiments, the value of ThrKc$^{MID}$ is in the range of from 0.1 to 0.5. According to certain embodiments, the value of ThrKc$^{MID}$ is 0.1, 0.12, 0.16, 0.18, 0.20, 0.22, 0.24, 0.26, 0.28, 0.30, 0.32, 0.34, 0.36, 0.38, 0.40, 0.42, 0.44, 0.46, 0.48, or 0.50. According to certain exemplary embodiments, the value of ThrKc$^{MID}$ is 0.24.

System for Managing Agricultural Irrigation

Figure 11:
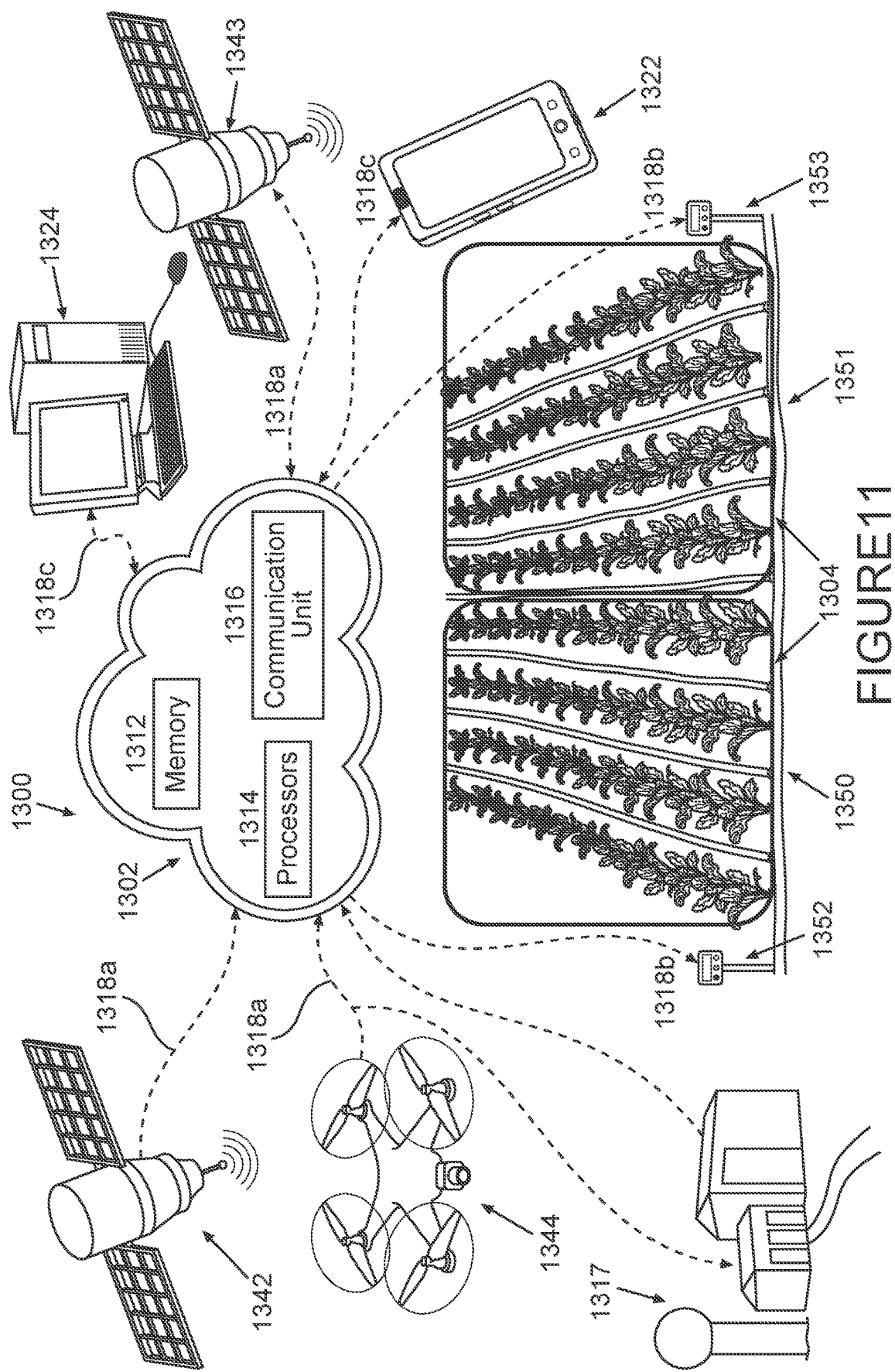
FIG. 11 schematically depicts a system for managing agricultural irrigation of a crop in a field, according to some embodiments of the present invention.

According to another aspect, the present invention provides a system for providing crop coefficient (Kc) values including near real time and forecast values for the management of precise agricultural irrigation of a crop in a field or a part thereof. Generally, the system is configured to manage agricultural irrigation of a crop or a plurality of crops in a field or a plurality of fields. FIG. 11 schematically depicts a system 1300, including a computing environment 1302, according to some embodiments of the present invention. Further depicted is a field 1304 (its irrigation is managed by system 1300), input data sources, which send data (e.g. remote sensing imagery data and optionally climatology data) to computing environment 1302, and output data targets, which receive data (e.g. Kc, ETa, irrigation recommendation/plan) from computing environment 1302.

According to certain embodiments, computing environment 1302 includes at least one memory 1312 (a computer-readable storage medium generally including non-volatile and volatile memory components), one or more computer processors 1314 operably coupled to memory 1312, and a communication unit 1316 configured to send/receive data to/from external targets/sources. Memory 1312 may be any suitable data storage device, including, but not limited to, volatile memory types such as random-access memory, DRAM, SDRAM, and others. Memory 1312 may also include non-volatile memory, including, but not limited to, read only memory, EEPROM, flash memory, optical and magnetic computer memory storage devices, and others. Memory 1312 stores computer-executable instructions for executing one or more of the methods of the present invention, such as methods 500, 600, 800, 900, 1000, 1100, and 1200. Computer processors 1314 are configured to execute the computer-executable instructions, as further elaborated on below in the description of FIG. 12.

Generally, computing environment 1302 is at least one online server (wherein at least one online server constitutes a "cloud environment") providing services to clients—e.g. smart phones (of users of system 1300) with custom software (application), as elaborated on below. The software may be: qualified by one or more smart phone manufacturers; launched automatically once the hardware device, such as an irrigation controller (1352, 1353 described hereinbelow) is paired with the smart phone; and/or the main console for the user (e.g. a personal computer 1324, described hereinbelow). The software application may provide all necessary instructions. The software application may gather data entered by the user of system 1300, to a data ingest module (1422, described hereinbelow); allow users of system 1300 to be authenticated before accessing the software application; and/or allow communication between the software application and computing environment 1302 to be encrypted. A client and server are generally remote from each other and typically interact through a communication network. The relationship of client and server arises by virtue of computer programs running on the respective computing devices and having a client-server relationship to each other. Computing environment 1302 is communicatively associated with the input data sources and the output data targets, via communication unit 1316 as indicated by arrows 1318a that designate data-flow into computing environment 1302, arrows 1318b that designate data-flow from computing environment 1302, and double arrows 1318c that designate bi-directional data-flow (i.e. to and from computing environment 1302). Generally, communication unit 1316 will be communicatively associated with the clients via a communications network, generally the Internet, but additionally/alternatively Wide Area Networks (WANs), Local Area Networks (LANs), analog or digital wired and wireless telephone networks (e.g. a Public Switched Telephone Network (PSTN)), an Integrated Services Digital Network (ISDN), a Digital Subscriber Line (xDSL)), or any other wired or wireless network. The communications network may include multiple networks or sub-networks, each of which may include, for example, a wired or wireless data pathway. According to some embodiments, communication unit 1316 is configured for satellite communication.

Input data may be obtained from a user of system 1300, via e.g. a user-controlled input data source, such as a smart phone 1322, a tablet (not shown), and/or a personal computer 1324 of the user, which may have a custom application (app) installed thereon, as further elaborated on below.

The input data sources further include remote sensing data sources obtained from one or more sensors. Remote sensing data may be spectral (measuring crop canopy reflectance), thermal (measuring the crop canopy temperature), radar (measuring the crop echo), and/or data obtained from other systems similar to radar which make use of other parts of the electromagnetic spectrum (such as LiDAR), and may be obtained from one or more satellites 1342 and 1343, one or more drones 1344, and one or more (manned or unmanned) airplanes (not shown). Both High-Resolution Satellites 1342 and Low-Resolution Satellites 1343 can be, for example, fine temporal resolution low-earth orbit satellites that provide a minimum of two spectral bands and other resource-monitoring satellites, and/or lower temporal frequency earth resources satellites.

Additional input data sources include climatology data sources, such as one or more weather services and networks (not shown), one or more local weather stations 1317, as further elaborated on below.

Output data targets include users of system 1300, or more precisely, remote devices of the users, such as smart phones, tablets, and/or personal computers, for example, smart phone 1322 and personal computer 1324. Specifically, computing environment 1302 is configured to send Kc values, ETa values, irrigation recommendations and combinations thereof to users of system 1300, as further elaborated on below. Other possible output data targets include irrigation controllers, such as an irrigation controller 1352 and 1353 located in field 1304. Subplots represented by 1350 and 1351 with separate irrigation controllers may includes further irrigation elements such as a drip irrigation system, sprinklers, and the like, and the irrigation controllers 1352 and 1353 can be configured to regulate (control) irrigation (e.g. start, stop, increase rate) by the irrigation elements of individual subplots enabling precision agriculture. More specifically, irrigation controllers 1352 and 1353 are configured to regulate the irrigation of the field 1304 according to irrigation instructions received from irrigation computation module 1452 which is either external or built-in to the irrigation controllers 1352, 1353, 1490. According to some embodiments, system 1300 includes at least one irrigation controller such as irrigation controller 1352.

System Components for Managing Agricultural Irrigations

Figure 12:
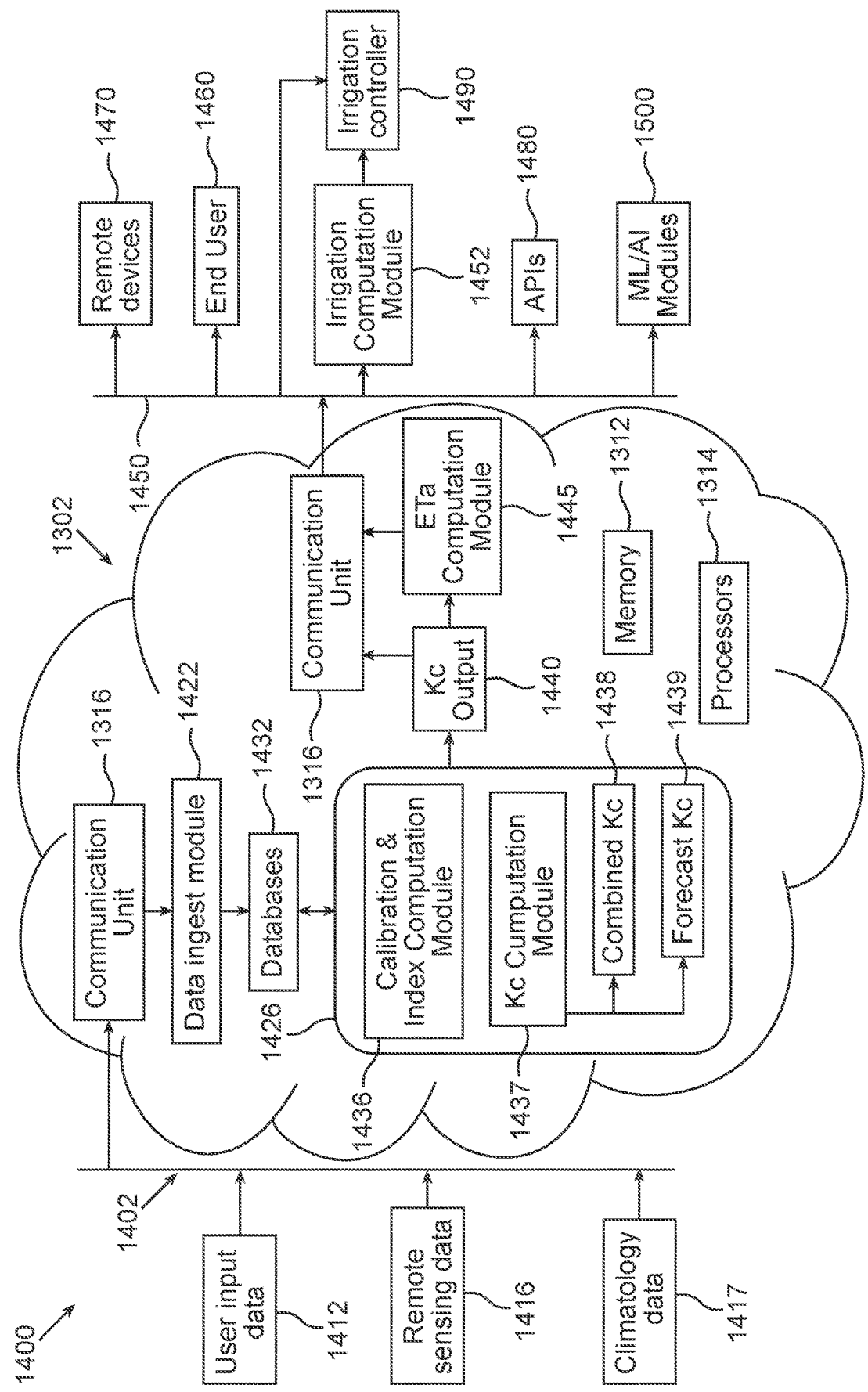
FIG. 12 shows a diagram of an analytical framework for managing agricultural irrigation of crops, according to some embodiments of the present invention.

FIG. 12 is a diagram of system components in an analytical framework 1400 for providing crop coefficient (Kc) values according to certain embodiments of the invention, including near real time and forecast values for the management of precise agricultural irrigation in one or more fields, such as field 1304, according to some embodiments of the present invention. Input data 1402 from various input data sources is received by the communications unit 1316 and then ingested into computing environment 1302. Input data 1402 includes user input data 1412, (data obtained from the user via e.g. smart phone 1322 and/or personal computer 1324), remote-sensing data 1416 and optionally, climatology data 1417.

User input data 1412 will generally include the field and/or sub plot boundary, the species of the crop(s) and the date(s) of the start of the growing period. Optionally, user input data further include irrigation method (e.g. drip irrigation or sprinklers) and additional field parameters (e.g. soil texture, soil and water salinity, organic matter, irrigation rate).

Remote sensing data 1416 include spectral and/or thermal and/or radar crop data from which the Kc will be obtained according to the teachings of the invention. According to some embodiments, remote sensing data 1416 are raw in the form of camera outputs of a drone or an airplane (in particular, without any location information). According to some embodiments, remote sensing data 1416 include location information, for example, Landsat images obtained from the National Aeronautics Space Administration (NASA). According to some embodiments, remote sensing data 1416 include location information, and further include pixel values given in physical units (such as reflectance or temperature), for example, Sentinel-2 images from the European Space Agency (ESA).

Climatology data 1417 include ET0 and/or air temperature, radiation, relative humidity, precipitation, and wind speed per field managed by system 1300. Climatology data 1417 may be obtained, for example, from one or more weather services and/or one or more local weather stations (e.g. within 5-10 km of the managed field, such as local weather stations 1317, which are located nearby field 1304).

Input data 1402 received by the communications unit 1316 from any communications protocol may be first formatted into a text format and then transferred to be ingested by a data ingest module 1422. The ingested data is stored (permanently or temporarily) in memory 1312 (i.e. in databases 1432) and transferred to one or more data processing modules 1426. Databases 1432 generally include an agricultural database storing data specifying, e.g. RCCC tables, and a managed-fields database storing data associated with each of fields managed by system 1300, optionally including historical data. The managed-fields database is partitioned into different sections dedicated to each field.

Data processing modules 1426 includes a calibration and index computations module 1436 to preprocess input data and a Kc computation module 1437 which generates the Combined Kc values 1438 according to the example method 800 and the Forecast Kc value 1439 according to example methods 900-1200.

The Kc output module 1440 acts as an interface between the data processing module 1426 outputting Kc values and the communications unit 1316. Optionally, the Kc output module 1440 further acts as an interface between the data processing module 1426 outputting Kc values and the ETa computation module 1445, the later forward data to the communications unit 1316. The communications unit 1316 forwards output data 1450 (Kc output data and/or ETa output data) in a format as may be required to several components. These components include the irrigation computation module 1452 which can be an embedded computer capable of calculating irrigation plans and in turn providing instructions to one or more precision irrigation controllers 1490, 1352, 1353. Output data 1450 can also interfaces to end users 1460, one or more remote devices 1470 (e.g. smart phone 1322, personal computer 1324), and an application programming interfaces (APIs) 1480 and a ML/AI Module, all of which are able to then send instructions to one or more irrigation controllers 1490, 1352, 1353 via the communication unit 1316, which acts as bi-directional hub for all communications with irrigation controllers 1490, 1352 or 1353 either directly or through an irrigation computation module 1452.

FIG. 12 depicts a specific embodiment of data processing module 1426. Data processing interfacing to one or more machine learning (ML) and/or artificial intelligence (AI) modules: ML/AI modules 1500. ML/AI modules 1500 are configured to improve computing environment 1302 irrigation recommendations by analyzing, for example, past recommendations during a past growing season (or a part thereof) and measurement data of the crops during the past growing season, including, for example, data for generating RCCC, as well as optionally climatology data during the growing season and the crop yield at the end of the season, and/or the like.

Calibration module and index computation module 1436 are configured to analyze remote-sensing imagery data. According to some embodiments, calibration module and index computation 1436 data may be configured to match (and/or confine) the images to the field and/or subplot boundaries, remove cloud effects and atmospheric effects as to calibrate the imagery data received from multiple remote sensors and to calculate an individual recommendation for each subplot. Calibration module and index computation 1436 is configured to receive data from satellites 1342 and 1343, the said remote sensing data 1416 inputs, to convert the received data into one or more vegetation indices such as EVI and NDVI.

According to some embodiments, calibration module and index computation 1436 removes pixels at the extreme ends of a scale (e.g. an intensity scale) or pixels having at least one component at an extreme end of a scale.

The Kc computation module 1437 is configured to compute the value of the crop coefficient Kc based on vegetation index data obtained from the calibration module and index computation module 1436 to provide combined Kc values 1438. To provide forecast Kc 1439 the Kc computation module 1437 further computing reference Kc curve (e.g. FAO curve) including Kc values for a growing period, including the initial growing period (IGP), development growing period (DGP), middle growing period (MGP) and late growing period (LGP).

The methods of the present invention, such as methods 500, 600, 800, 900, 1000, 1100, and 1200, may be implemented by many different computing environments. For example, computing environment 1302 may include a special purpose computer, a programmed microprocessor or microcontroller, and peripheral integrated circuit element(s), an ASIC or other integrated circuit, a digital signal processor, an image processor (e.g. to covert raw imagery data to processed imagery data), electronic or logic circuitry such as discrete element circuit, a programmable logic device or gate array such as a PLD, PLA, FPGA, PAL, and any comparable means.

The term "microprocessor", or "microcontroller" as used herein, refers broadly without limitation, to a computer system, a computer equivalent, or a processor which is designed to perform arithmetic and/or logic operations using logic circuitry that responds to and processes the basic instructions that drive a computer. Thus, the term "microprocessor" refers to any device comprising a programmable digital electronic component that incorporates the functions of a central processing unit (CPU) on a single semiconducting integrated circuit (IC). Typical computer systems may comprise one or more microprocessors. Therefore, the term "microprocessor" as used herein, typically refers to a device comprising at least one microprocessor.

In general, any means of implementing the methods disclosed herein, such as methods 500, 600, 800, 900, 1000, 1100, and 1200, can be used to implement the various aspects of the present invention. Exemplary hardware that can be used for the present invention includes computers (e.g. a cloud-based computing environment, according to some embodiments of computing environment 1302), handheld devices (e.g. a tablet of a user of system 1300), telephones (e.g., cellular, Internet enabled, digital, analog, hybrids, and others), such as smart phone 1322, and other such hardware. Some of these devices include processors (e.g., a single or multiple microprocessors), memory, non-volatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, non-transitory or otherwise, executed on programmed general-purpose computer with the cooperation of a controller and memory, a special purpose computer, a microprocessor, or the like. In these instances, the systems and methods of this invention can be implemented as a program embedded on personal computer such as an applet, JAVA or CGI script, as a resource residing on a server or computer workstation, as a routine embedded in a dedicated measurement system, system component, or the like. The system can also be implemented by physically incorporating the system and/or method into a software and/or hardware system.

Additionally, the data processing operations disclosed herein may be performed by one or more program instructions stored in or executed by such memory, and further may be performed by one or more modules (e.g. data processing modules 1426) configured to carry out those program instructions. "Modules" refer to any known or later developed hardware, software, firmware, artificial intelligence, fuzzy logic, expert system or combination of hardware and software that is capable of receiving, sending, storing, and/or processing data according to the described functionality thereof.

As used herein, according to some embodiments, "remote sensing apparatus" refers to a satellite, a drone, and/or an airplane having means configured for remote sensing.

EXAMPLES

Example 1: Effect of Imagery Data Calibration

The significance of calibrating raw imagery data before computing the crop coefficient Kc was evaluated using high resolution imagery data obtained for a growing area of processing tomato during a period of Mar. 28, 2016 to Aug. 4, 2016. The growing area, of about 20 hectares, was located at Latitude 32.619, Longitude 35.265, and included five management zones, each of about 4 hectares.

The remote sensing data were obtained from three available satellites: Landsat 8 (on April 7, April 23, May 9, May 25, July 12 and July 28); Sentinel-2 (on April 16, April 26, May 16, June 5, June 15, June 25, July 15, July 25 and August 4) and SPOT-6 (on May 21).

Kc computation was performed as follows:

Imagery data at the near infra red (NIR), red (R) and blue (B) were used to compute the enhanced vegetation index (EVI). In this experiment, imagery data representing bare ground, as are defined for each of the sensor used, were removed from further analyses. EVI was computed according to the following equation:

$$EVI = 2.5 * ((NIR-R)/(NIR+6*R-7.5*B+1)) \tag{1}$$

The EVI was then converted to vegetation fraction (percentage of growing area covered by plants) by the equation:

$$\text{Vegetation fraction } (Vf) = EVI * 94.8 + 14.5. \tag{2}$$

Kc values were obtained following Allan and Pareira (2009, ibid) by the following equation:

$$0.15 + Vf/100 * (1.148 - 0.15) \quad (3)$$

Figure 9:
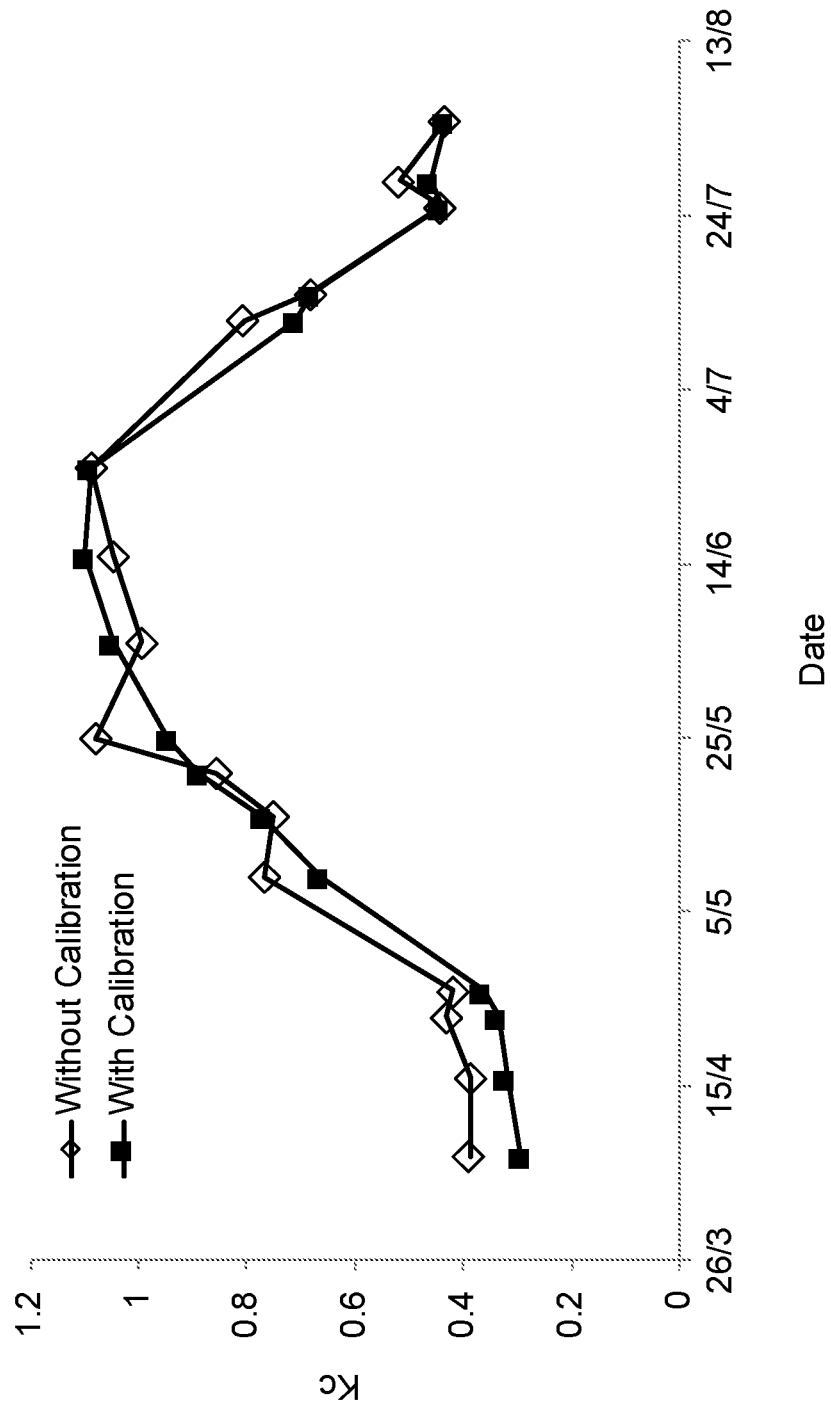
FIG. 9 demonstrates Kc values computed using the imagery data as received (without calibration) and imagery data calibrated using the Empirical Line Method with reference plots.

FIG. 9 shows Kc values computed using the imagery data as received (without calibration) and imagery data calibrated using the Empirical Line Method with reference plots. It is clearly shown in FIG. 9 that calibrating the imagery data provides for a curve shape similar to pre-determined (e.g. the FAO) Kc curves.

Example 2: Computation of Weekly Kc

The growing area of processing tomato described above was used to evaluate the accuracy of Kc calculation using high- and low-resolution imagery data according to the teachings of the invention (CKc). Imagery as well as in situ data were obtained for two zones (subplots), each controlled by a single irrigation valve (zone 1 and zone 2). The average vegetation fraction at zone 1 was lower compared to the vegetation fraction at zone 2.

The in-situ data included at least 20 measurements of vegetation fraction for each zone, at each day of measurements. The average and standard deviation were calculated, presenting very homogenous data for each zone/day (coefficient-of-variance <10%). The average from each zone was utilized to calculate the Kc according to Equation 3 as described hereinabove.

The imagery data included data received from the high-resolution sensors Landsat 8, Sentinel-2 and SPOT-6 at the dates described hereinabove and from the low-resolution sensors Aqua and Terra, practically throughout the growing season (data were available almost every day).

Calibration of the imagery data, calculation of EVI and Vf and computing Kc values was performed as described hereinabove.

Computation of high-resolution Kc (HRKc) values was performed according to steps 510 to 590 of FIG. 5.

Computation of low-resolution Kc (LRKc) values was performed according to steps 610 to 720 of FIG. 6.

Computation of combined Kc (CKc) was performed as described in steps 810 to 840 of FIG. 7.

Figure 10A:
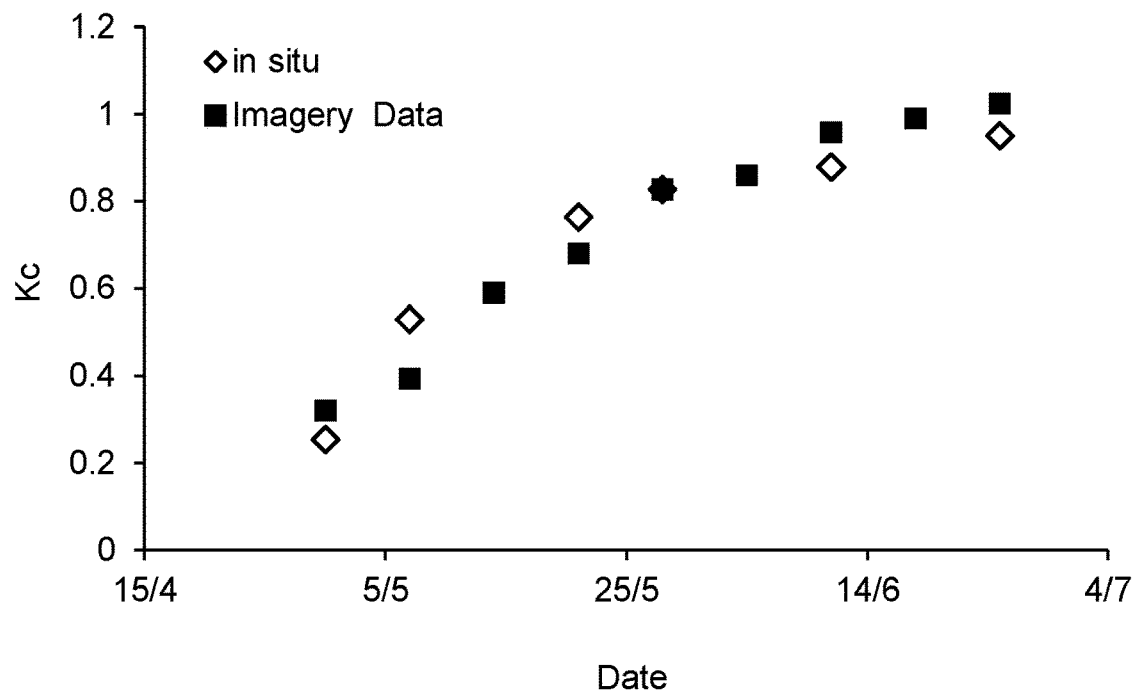
FIGS. 10a-10b show a comparison of Kc values computed based on in situ measurements and on imagery data received from satellites for zone 1 and zone 2, respectively.
Figure 10B:
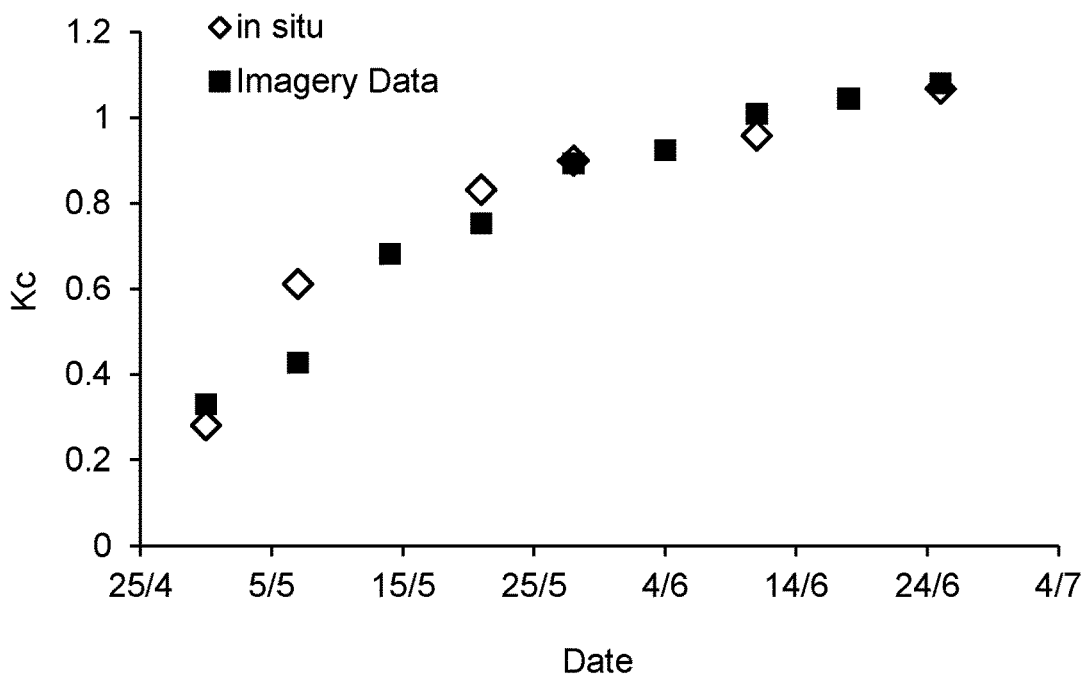

FIGS. 10a and 10b show a comparison of Kc values calculated from in situ measurements and Kc values obtained from imagery data for zone 1 and zone 2, respectively. With the exception of data obtained on May 9, 2016 (which was exceptionally cloudy day of the season), Kc values computed from imagery data according to the teachings of the present invention were highly similar to those obtained from actual measurements within the field. These results validate the methods of the present invention.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A method for generating a near real time crop coefficient (Kc) for use in managing agricultural irrigation of a crop in a field or a subplot thereof the method comprising:
    providing a computing environment comprising at least one computer processor and at least one computer-readable storage medium operably coupled to the computer processor and having program instructions stored therein and data specifying a boundary of the field and of at least one subplot, the computer processor being operable to execute the program instructions to generate a high resolution (HR) near real time (NRT) crop coefficient ($HRKc^{NRT}$) at a time t ($HRKc^{NRT}(t)$) by performing the steps of:
    receiving remote sensing data from one or more high spatial resolution remote sensors at a time t, wherein the imagery data comprise values associated with a plurality of pixels, each pixel is equal to or less than 30 m×30 m;
    computing a high-resolution Kc (HRKc) value for each pixel, the pixel being in its entirety within the boundaries of at least one subplot, using a remote sensing derived index to obtain a plurality of HRKc values;
    selecting HRKc values equal to or greater than a number in the range of 0.15 to 0.3 from the plurality of HRKc values, to obtain a first set of selected HRKc values;
    computing from the first set of selected HRKc values a first mean HRKc value (HRKc-M1) and a standard deviation (STD);
    removing from the first set of HRKc values any of which is less than a first threshold being the sum of HRKc-M1 minus one STD to obtain a second set of HRKc values;
    removing from the second set of HRKc values any of which is greater than a second threshold value being the sum of HRKc-M1 plus two STD's to obtain a third set of HRKc values;
    computing from the third set of selected values a second mean HRKc value (HRKc-M2);
    setting the $HRKc^{NRT}(t)$ to equal HRKc-M2;
    computing an actual evapotranspiration (ETa) value;
    setting an irrigation recommendation;
    generating, as output data, the $HRKc^{NRT}(t)$, a near real time combined Kc($CKc^{NRT}(t-t_{nx})$) value, a forecast Kc (FKc) value, an actual evapotranspiration (Eta) value, irrigation recommendation or a combination thereof; and
    delivering the output $HRKc^{NRT}$, the ETa value or the irrigation recommendation to at least one of (i) a remote device of at least one user and (ii) at least one irrigation controller.

2. The method of claim 1, wherein the plurality of pixels corresponds to a single subplot or to a plurality of subplots.

3. The method of claim 1, wherein the remote sensing data are selected from the group consisting of spectral reflectance data, thermal data, radar data and Light Detection and Ranging (LiDAR) data of the crop canopy.

4. The method of claim 1, wherein the remote sensing data are received from a plurality of remote sensors and wherein said remote sensing data are spectral data.

5. The method of claim 4, said method further comprises calibrating the spectral data received from the plurality of remote sensors before computing the HRKc value for each pixel.

6. The method of claim 1, wherein the remote sensing derived index is a vegetation index.

7. The method of claim 1, said method further comprises generating a near real time combined Kc value ($CKc^{NRT}$) for use in managing agricultural irrigation during a period of time, the period defined by time t in which high resolution remote sensing data are available and time $t_x$ to $t_{nx}$ ($t_x$–$t_{nx}$) in which high resolution remote sensing data are not available, by performing the steps of:
- computing a low resolution near real time Kc value ($LRKc^{NRT}$) at a time t' (LRKcNRT(t')) wherein t' is between time t to time $t_{nx}$ (t–$t_{nx}$) by performing the steps of:
  - receiving remote sensing data from one or more low resolution remote sensors at time t', wherein the imagery data comprise values associated with at least one pixel, each pixel is greater than 30 m×30 m;
  - selecting at least one pixel having 67% of the pixel data within the boundaries of the field; and
  - when more than one pixel is selected:
    - computing Kc value for each pixel using a remote sensing derived index to obtain a first set of LRKc values;
    - selecting LRKc values equal to or greater than a number in the range of 0.15 to 0.3 from the first set to obtain a second set of selected LRKc values;
    - computing a mean of the second set of Kc values to obtain $LRKc^{NRT}$-M; and
    - setting $LRKc^{NRT}$ (t') to equal $LRKc^{NRT}$-M;
  - when one pixel is selected:
    - computing Kc value for the pixel using a remote sensing derived index; and
    - when the Kc value is equal to or greater than a number in the range of 0.15 to 0.3, setting the computed Kc value $LRKc^{NRT}$(t');
- computing $CKc^{NRT}$ during the time period t to $t_{nx}$ (t–$t_{nx}$) by:
  - at time t, setting the $CKc^{NRT}$ to equal the generated $HRKc^{NRT}$(t);
- at each time point $t_x$ to $t_{nx}$, with each time point incremented by a discrete time amount of x, computing $LRKc^{NRT}(t_x$–$t_{nx})$ and setting the $CKc^{NRT}$ to equal the sum of $HRKc^{NRT}(t)+[(LRKc^{NRT}(t_{nx})$ minus $LRKc^{NRT}$(t')].

8. The method of claim 7, wherein at least one exists: the discrete time amount of x is about a day; subscript n denotes a number of days in which high resolution remote sensing data are not available; and time $t_x$ denotes time t plus one day.

9. A method for generating a forecast Kc (FKc) for use in managing agricultural irrigation of a crop in a field or a subplot thereof during a growing period, by performing the steps of:
- within a computing environment comprising at least one computer processor and at least one computer-readable storage medium operably coupled to the computer processor and having program instructions stored therein and data specifying a boundary of the field and/or at least one subplot thereof and a reference crop coefficient curve (RCCC) for the growing period, the computer processor being operable to execute the program instructions to generate the FKc by performing the steps of:
  - obtaining near real time Kc ($Kc^{NRT}$) at a time t ($Kc^{NRT}$(t));
  - setting a time $t_f$ for which FKc is required; and
  - when t and $t_f$ are within the start of the initial growth period (IGP) to the start of the middle growing period (MGP) on the time axis of the RCCC:
    - obtaining a maximum Kc value from the RCCC at the MGP ($Kc^{MID}$);
    - computing the number of days from t to $t_f$ to obtain $\Delta T_1$;
    - computing the number of days from t to the start of the MGP ($t_{MGPs}$) to obtain $\Delta T_2$; and
    - computing FKc to equal $Kc^{NRT}(t)+([Kc^{MID}-Kc^{NRT}(t)]/\Delta T_2)*\Delta T_1$;
  - when t is before or within a period from the start of the MGP to the end of the MGP on the time axis of the RCCC and $t_f$ is within the period;
    - obtaining a threshold minimal Kc value from the RCCC for said period ($ThrKc^{MID}$);
    - obtaining $Kc^{NRT}$ at a time $t_L$ ($Kc^{NRT}t_L$) which is before the time t; and
      - when $KC^{MID}>Kc^{NRT}(t)>KC^{NRT}-ThrKc^{MID}$, setting FKc to equal $Kc^{NRT}$(t);
      - when $KC^{MID}<Kc^{NRT}$ (t), setting FKc to equal $KC^{MID}$;
      - when $Kc^{NRT}(t)<Kc^{NRT}t_L-ThrKc^{MID}$, setting FKc to equal $Kc^{NRT}(t_L)$;
  - when t and $t_f$ are within a period from the start of the late growing period (LGP, LGPs) to the end of the LGP (LGPe) on the time axis of the RCCC:
    - obtaining the most recent $Kc^{NRT}$ value from the MGP ($MGPKc^{NRT}$(r));
    - obtaining a minimum Kc value from the RCCC at LGPe ($Kc^{LGPe}$);
    - computing the number of days from the start of the LGP ($t_{LGPs}$) to $t_f$ obtaining $\Delta T_3$,
    - computing the number of days from the start of the LGP ($t_{LGPs}$) to the end of the LGP ($t_{LGPe}$) to obtain $\Delta T_4$; and
      - when $Kc^{NRT}(t)>Kc^{LGPe}$, computing FKc to equal $MGPKc^{NRT}(r)-([MGPKc^{NRT}(r)-Kc^{LGPe}]/\Delta T_4)*\Delta T_3$;
      - when $Kc^{NRT}(t)<Kc^{NRT}(t)<Kc^{LGPe}$, setting FKc to equal $Kc^{LGPe}$;
  - computing an actual evapotranspiration (ETa) value;
  - setting an irrigation recommendation;
  - generating, as output data, the $HRKc^{NRT}$, $CKc^{NRT}(t-t_{nx})$, FKc, ETa, irrigation recommendation or a combination thereof; and
  - delivering the output $HRKc^{NRT}$, the ETa value or the irrigation recommendation to at least one of (i) a remote device of at least one user and (ii) at least one irrigation controller.

10. The method of claim 9, wherein at least one exists: the obtained $Kc^{NRT}$ is a high resolution $Kc^{NRT}$, computed according to the method of claim 1; the obtained $Kc^{NRT}$ is a combined $KC^{NRT}$, computed according to the method of claim 7; and the value of $ThrKc^{MID}$ is in the range of from 0.1 to 0.5.

11. The method of claim 9, wherein the reference crop coefficient curve (RCCC) is produced from data selected from the group consisting of tabular values and values obtained from archive data analyses.

12. The method of claim 11, wherein the archive data are analyzed by machine learning techniques.

13. A system for generating crop coefficient (Kc) values for managing agricultural irrigation of a crop in a field and/or a part thereof, the system comprising:
- a computing environment, the computing environment comprising:

at least one computer-readable storage medium having computer-executable instructions stored therein and data specifying a crop type, and a boundary of the field and/or the part thereof; and at least one computer processor operably coupled to at least one computer-readable storage medium and configured by the computer-executable instructions;

wherein the computing environment is able to:

receive remote sensing data from one or more high resolution remote sensors at a time t, wherein the imagery data comprises a plurality of pixels, each pixel is equal to or less than 30 m×30 m;

receive remote sensing data from one or more low resolution remote sensors at time t', wherein the imagery data comprises at least one pixel, each pixel is greater than 30 m×30 m and is equal or less than 300 m×300 m;

compute a combined near real time combined crop coefficient ($CKc^{NRT}(t)$) by;

computing a high-resolution Kc (HRKc) value for each pixel, the pixel being in its entirety within the boundaries of at least one subplot, using a remote sensing derived index to obtain a plurality of HRKc values;

selecting HRKc values equal to or greater than a number in the range of 0.15 to 0.3 from the plurality of HRKc values, to obtain a first set of selected HRKc values;

computing from the first set of selected HRKc values a first mean HRKc value ($HRKc_{-M1}$) and a standard deviation (STD);

removing from the first set of validated HRKc values any of which are less than a first threshold being the sum of HRKc-M1 minus one STD to obtain a second set of HRKc values;

removing from the second set of HRKc values any which are greater than a second threshold value being the sum of HRKc-M1 plus two STD's to obtain a third set of HRKc values;

computing from the third set of selected values a second mean HRKc value ($HRKc-M_2$); and setting the $HRKc^{NRT}(t)$ to equal $HRKc-M_2$;

compute a low resolution near real time Kc value ($LRKc^{NRT}$) at a time t' ($LRKc^{NRT}(t')$) wherein t' is between time t to time $t_{nx}$ ($t-t_{nx}$) by:

receiving remote sensing data from one or more low resolution remote sensors at time t', wherein the imagery data comprises at least one pixel, each pixel is greater than 30 m*30 m;

selecting at least one pixel having 67% of the pixel data within the boundaries of the field; and when more than one pixel is selected:

computing Kc value for each pixel using a remote sensing derived index to obtain a first set of LRKc values;

selecting LRKc values equal to or greater than a number in the range of 0.15 to 0.3 from the first set to obtain a second set of selected LRKc values;

computing a mean of the selected Kc values to obtain $LRKc^{NRT}_{-M}$; and setting $LRKc^{NRT}(t')$ to equal $LRKc^{NRT}_{-M}$;

when one pixel is selected:

computing Kc value for the pixel using a remote sensing derived index; and when the Kc value is equal to or greater than a number in the range of 0.15 to 0.3, setting the computed Kc value $LRKc^{NRT}(t')$;

computing $CKc^{NRT}$ during the time period t to $t_{nx}$ ($t-t_{nx}$):

at time t, setting the $CKc^{NRT}$ to equal the set $HRKc^{NRT}(t)$;

at each time point $t_x$ to $t_{nx}$, with each time point incremented by a discrete time amount of x, computing $LRKc^{NRT}(t_x-t_{nx})$ and setting the $CKc^{NRT}$ to equal the sum of $HRKc^{NRT}(t)$+ [($LRKc^{NRT}(t_{nx})$ minus ($LRKc^{NRT}(t')$)]; optionally the system is further configured to:

generate an actual evapotranspiration (ETa) value;

generate an irrigation recommendation; and generate as output data, the $CKc^{NRT}$, ETa, irrigation recommendation or a combination thereof.

14. The system of claim 13, wherein the remote sensing data for each pixel or the plurality of pixels correspond to a respective area within the field or the part thereof.

15. The system of claim 13, wherein the remote sensing data are selected from the group consisting of spectral reflectance data, thermal data, radar data and Light Detection and Ranging (LiDAR) data of the crop canopy.

16. The system of claim 13, wherein the remote sensing data are received from a plurality of remote sensors and wherein said remote sensing data are spectral data.

17. The system of claim 16, said system is further configured to calibrate the spectral data received from the plurality of remote sensors before computing the HRKc value for each pixel.

18. The system of claim 13, wherein the remote sensing derived index is a vegetation index.

19. The system of claim 13, wherein at least one exists: the discrete time amount of x is about a day; the subscript n denotes a number of days in which high resolution remote sensing data are not available; the time $t_x$ denotes time t plus one day.

20. The system of claim 13, said system further comprising an irrigation controller, located near or within the field or the part thereof, the irrigation controller being configured to receive the output data generated by the computing environment.

21. The system of claim 20, wherein the irrigation controller is configured to regulate irrigation in the field or the part thereof according to the output data received from the computing environment.

* * * * *